Nov. 17, 1959 I. C. MAXWELL ET AL 2,913,155

FOLDING TABLE

Filed Dec. 24, 1953 18 Sheets-Sheet 1

INVENTORS
IRA C. MAXWELL
OLE H. LANGEN
DAN R. PLEHAL
BY
Paul, Moore & Hugger
ATTORNEYS Nov. 17, 1959 I. C. MAXWELL ET AL 2,913,155

FOLDING TABLE

Filed Dec. 24, 1953 18 Sheets-Sheet 2

INVENTORS
IRA C. MAXWELL
OLE H. LANGEN
DAN R. PLEHAL

BY Paul, Moore & Rugger

ATTORNEYS

Nov. 17, 1959 I. C. MAXWELL ET AL 2,913,155

FOLDING TABLE

Filed Dec. 24, 1953 18 Sheets-Sheet 3

INVENTORS
IRA C. MAXWELL
OLE H. LANGEN
DAN R. PLEHAL

BY Paul, Moore & Hugger
ATTORNEYS

INVENTORS
IRA C. MAXWELL
OLE H. LANGEN
DAN R. PLEHAL
BY Paul, Moore & Hugger
ATTORNEYS Nov. 17, 1959 I. C. MAXWELL ET AL 2,913,155

FOLDING TABLE

Filed Dec. 24, 1953 18 Sheets-Sheet 5

INVENTORS
IRA C. MAXWELL
OLE H. LANGEN
DAN R. PLEHAL

BY Paul, Moore & Rugger

ATTORNEYS

Nov. 17, 1959 I. C. MAXWELL ET AL 2,913,155

FOLDING TABLE

Filed Dec. 24, 1953 18 Sheets-Sheet 6

INVENTORS
IRA C. MAXWELL
OLE H. LANGEN
DAN R. PLEHAL
BY Paul, Moore & Lugger
ATTORNEYS Nov. 17, 1959 I. C. MAXWELL ET AL 2,913,155

FOLDING TABLE

Filed Dec. 24, 1953 18 Sheets-Sheet 7

INVENTORS
IRA C. MAXWELL
OLE H. LANGEN
DAN R. PLEHAL

BY Paul, Moore & Lugger

ATTORNEYS

INVENTORS
IRA C. MAXWELL
OLE H. LANGEN
DAN R. PLEHAL
BY
Paul, Moore & Dugger
ATTORNEYS INVENTORS
IRA C. MAXWELL
OLE H. LANGEN
DAN R. PLEHAL
BY Paul, Moore & Legger
ATTORNEYS INVENTORS
IRA C. MAXWELL
OLE H. LANGEN
DAN R. PLEHAL
BY Paul, Moore & Hugger
ATTORNEYS INVENTORS
IRA C. MAXWELL
OLE H. LANGEN
DAN R. PLEHAL
BY Paul, Moore & Dugger
ATTORNEYS

INVENTORS
IRA C. MAXWELL
OLE H. LANGEN
DAN R. PLEHAL

BY Paul, Moore & Rugger

ATTORNEYS

Nov. 17, 1959 I. C. MAXWELL ET AL 2,913,155

FOLDING TABLE

Filed Dec. 24, 1953 18 Sheets-Sheet 13

INVENTORS
IRA C. MAXWELL
OLE H. LANGEN
DAN R. PLEHAL
BY Paul, Moore & Dugger
ATTORNEYS Nov. 17, 1959 I. C. MAXWELL ET AL 2,913,155

FOLDING TABLE

Filed Dec. 24, 1953 18 Sheets-Sheet 14

INVENTORS
IRA C. MAXWELL
OLE H. LANGEN
DAN R. PLEHAL

BY Paul, Moore & Rugger

ATTORNEYS

INVENTORS
IRA C. MAXWELL
OLE H. LANGEN
DAN R. PLEHAL
BY Paul, Moore & Dugger
ATTORNEYS Nov. 17, 1959 I. C. MAXWELL ET AL 2,913,155

FOLDING TABLE

Filed Dec. 24, 1953 18 Sheets-Sheet 16

INVENTORS
IRA C. MAXWELL
OLE H. LANGEN
DAN R. PLEHAL

BY Paul, Moore & Nugger

ATTORNEYS

INVENTORS
IRA C. MAXWELL
OLE H. LANGEN
DAN R. PLEHAL
BY Paul, Moore & Hugger
ATTORNEYS Nov. 17, 1959 I. C. MAXWELL ET AL 2,913,155

FOLDING TABLE

Filed Dec. 24, 1953 18 Sheets-Sheet 18

INVENTORS
IRA C. MAXWELL
OLE H. LANGEN
DAN R. PLEHAL
BY Paul, Moore & Hugger
ATTORNEYS United States Patent Office 2,913,155

Patented Nov. 17, 1959

2,913,155

FOLDING TABLE

Ira C. Maxwell and Ole H. Langen, Minneapolis, and Dan R. Plehal, Robbinsdale, Minn., assignors to The Unipress Company, Incorporated, Minneapolis, Minn., a corporation of Minnesota Application December 24, 1953, Serial No. 400,258

52 Claims. (Cl. 223—37)

This invention relates to new and useful improvements in a folding table for automatically folding garments such as shirts and the like into neat packages.

This invention more specifically relates to improvements in automatic shirt folding tables of the type disclosed in a co-pending application of Alan A. Reid, Ser. No. 267,372, filed January 21, 1952, now Patent Number 2,737,765, issued March 13, 1956.

It is an object of this invention to provide a new and useful means for automatically providing longitudinal and transverse folds in a shirt by mechanical means and in proper sequence.

It is a further object of this invention to provide an automatic shirt folding table wherein the shirt is positioned face downwardly thereon and wherein improved means is provided for successively folding the tail of the shirt upwardly, the sides of the shirt inwardly, for positioning a retaining band therearound and for then ejecting the shirt from the table.

Another object of this invention resides in an automatic shirt folding table of simplicity, constructed for folding a shirt into a net rectangular package without bulges or wrinkles and for positioning a retaining band therearound.

It is a further object of this invention to provide a new and useful shirt folding table upon which a shirt is adapted to be positioned face downwardly having means for retaining said shirt in face downward position and automatic and mechanical sequence means for folding the tail of the shirt upwardly, the sides of the shirt inwardly, and for ejecting the shirt from the table after the folding operations are completed.

It is another object of this invention to provide a new and useful automatic shirt folding table having unique retaining members for retaining the shirt in position on the table and new and improved mechanism for operating the same.

It is still a further object of this invention to provide a cam operated mechanical shirt folding table having positive control of all shirt folding parts.

Still a further object of this invention resides in the use of a plurality of expandable and contractible retaining means for retaining the shirt in position on the table and in the novel means for expanding and contracting the same.

Still other objects of the invention reside in the construction of the retaining arms, tail folding mechanism, the hold-down mechanism, side folding mechanism, band folding and sealing mechanism, and in the new and useful mechanism connecting the same.

Other objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings, forming part of this application, in which corresponding numerals refer to the same parts and in which.

Figure 4:
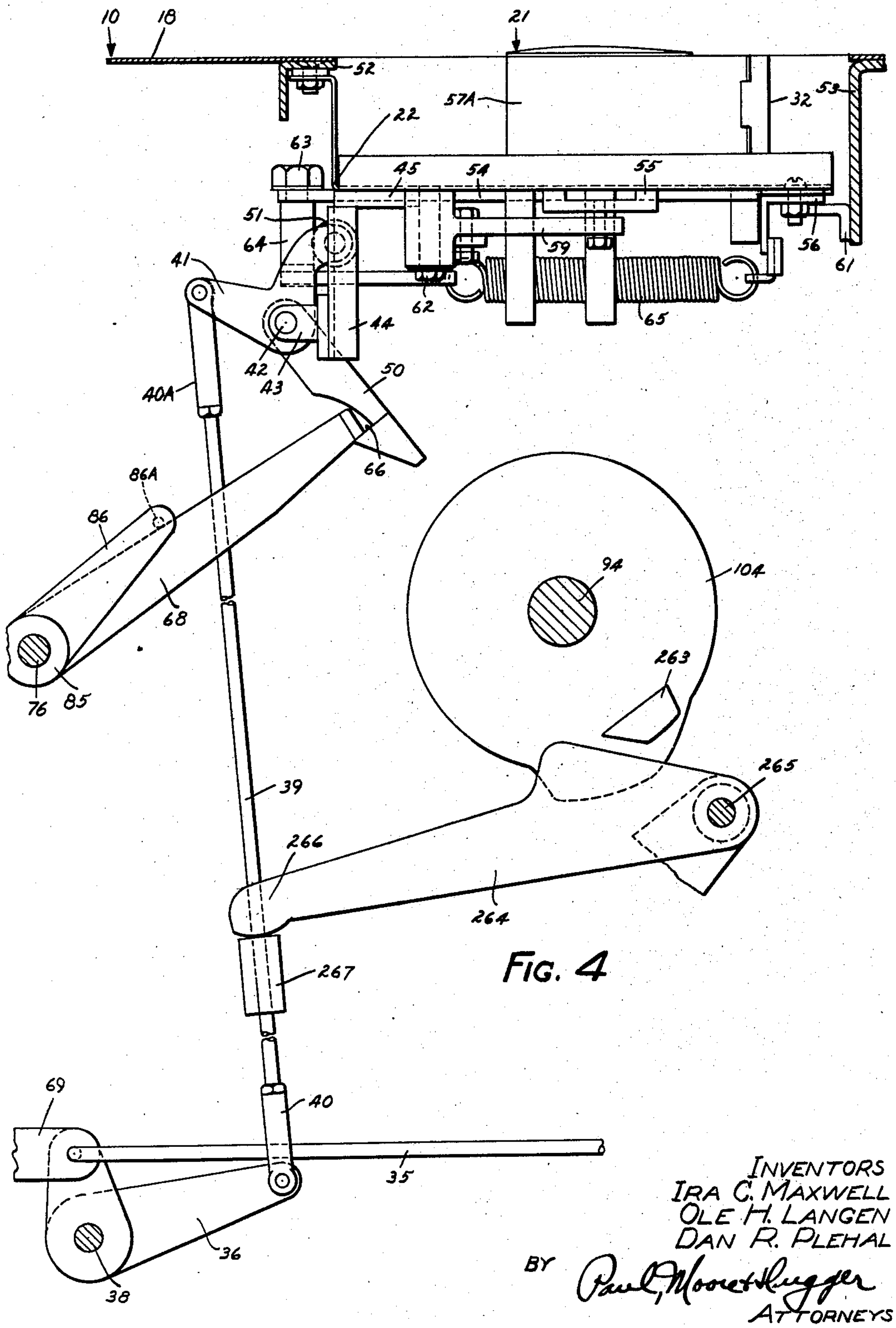
Figure 5:
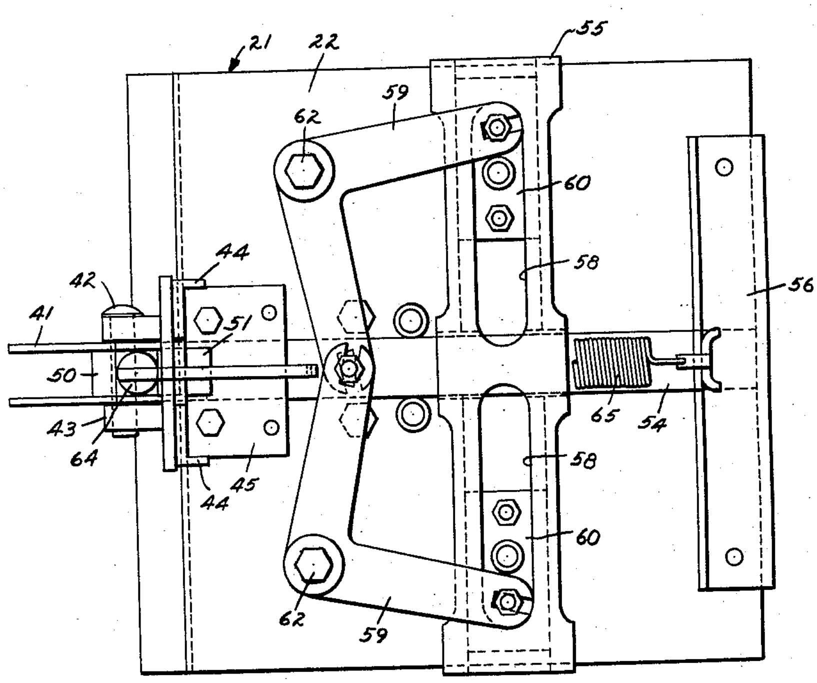
Figure 6:
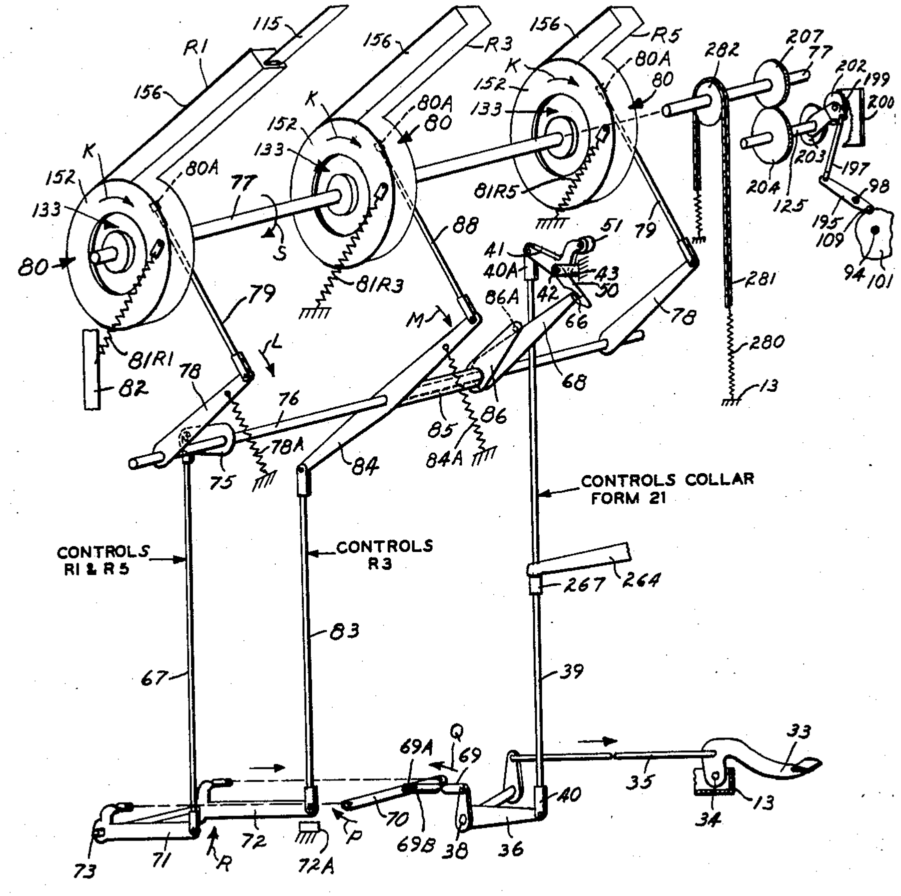
Figures 7, 8, 9:
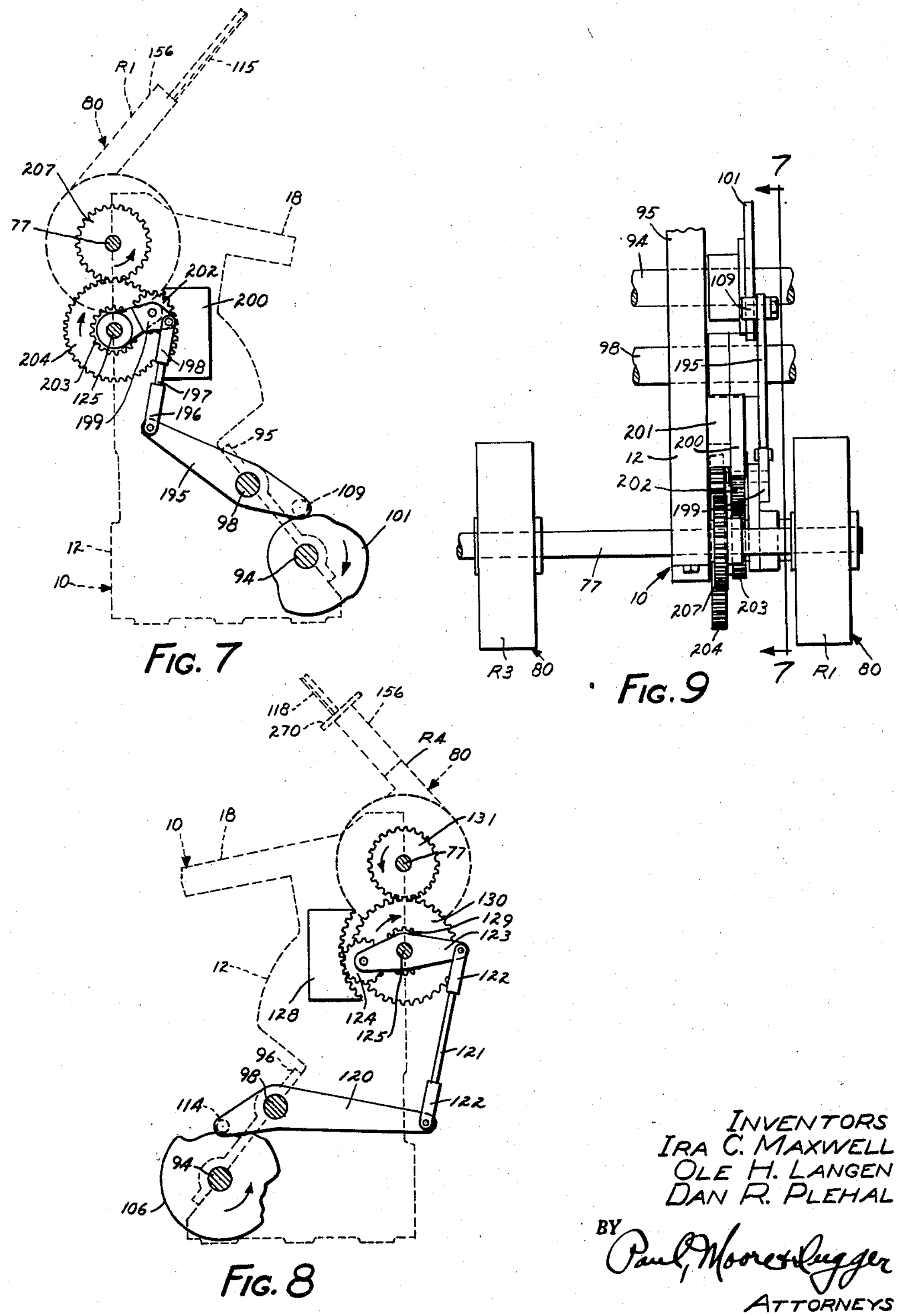
Figure 10:
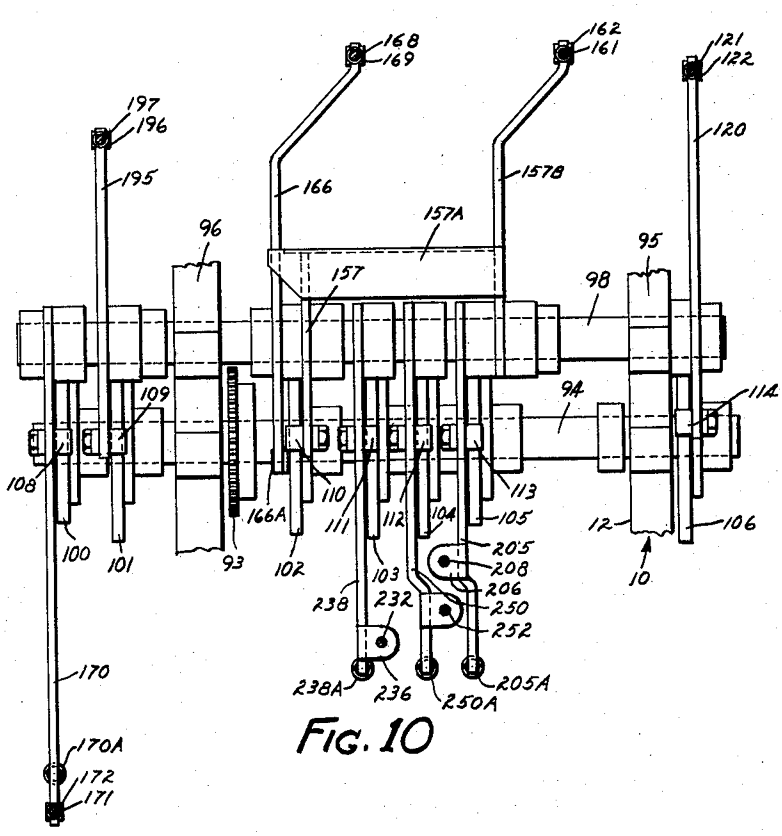
Figure 11:
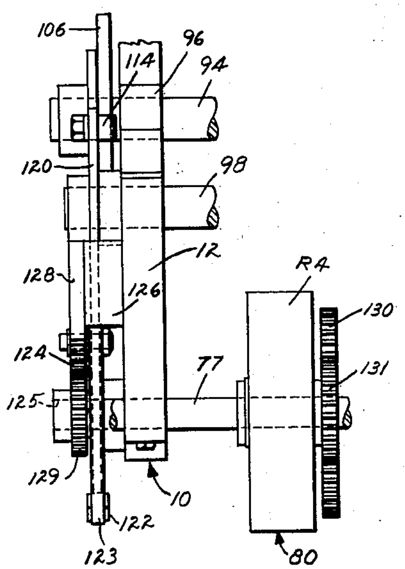
Figure 11A:
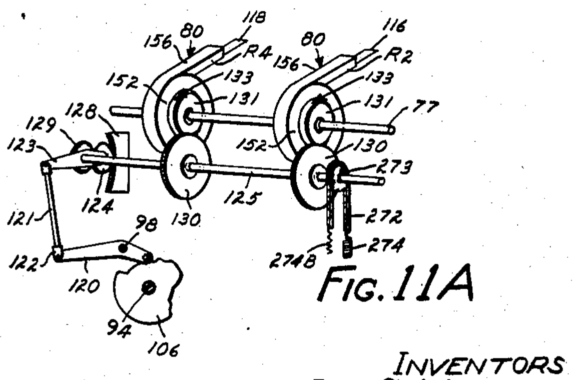

Figure 4 is a fragmentary elevation, partly in section, showing that portion of the apparatus that grips the collar during the folding operation, together with the mechanism for operating the same. This portion of the apparatus is usually called the "collar form." In this and certain other figures of the drawings, a particular work element (here the "collar form") is shown with its operating linkages, separated from the remainder of the apparatus. This is done for clarity in the drawings and to facilitate the explanation;

Figure 5 is a bottom plan view of the collar form of Figure 4;

Figure 6 is a fragmentary isometric schematic view of the shirt retainer drums Nos. R1, R3 and R5, shown separate from the remainder of the apparatus, of the instant invention. It may be noted, parenthetically, that there are five such shirt handling members or "shirt retainers" operating in timed relation in conjunction with divers other mechanisms. See also Figures 7 and 9;

Figure 7 is a vertical sectional view of the mechanism for operating the spools of Nos. R1, R3 and R5. The operating mechanisms for the spools of shirt retainers Nos. R1, R3 and R5 are similar to the spools of those for shirt retainers Nos. R2 and R4. The sectional view of Figure 7 is taken along the line and in the direction of the arrows 7—7 of Figure 9;

Figure 8 is a vertical section showing the operating mechanism for the spools of shirt retainers Nos. R2 and R4. See also Figures 11 and 11A;

Figure 9 is a fragmentary top plan view of the mechanism of Figure 7 which operates the spools of shirt retainers Nos. R1, R3 and R5;

Figure 10 is a top plan view of the cam mechanism of the apparatus of the instant invention, shown separated from the remaining parts of the device. The cam mechanism operates the shirt retainer drums and also the tail folder and certain other elements of the apparatus;

Figure 11 is a top plan view of the mechanism of Figure 8, which operates the spools of shirt retainers Nos. R2 and R4. See also Figures 11A, 27 and 28;

Figure 11A is a schematic isometric, rear, view of the operating mechanism for the spools of retainers R2 and R3.

Figure 15:
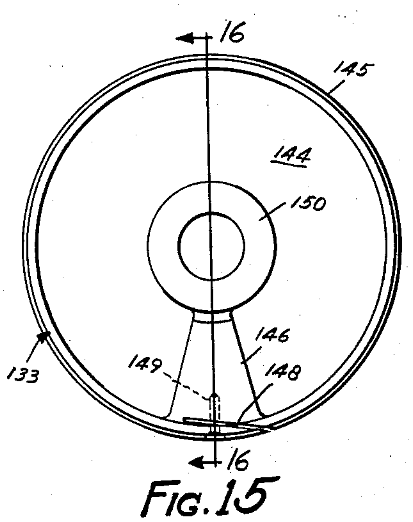
Figure 16:
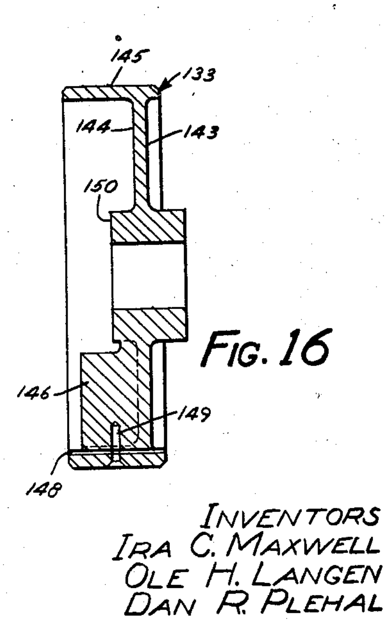
Figure 12:
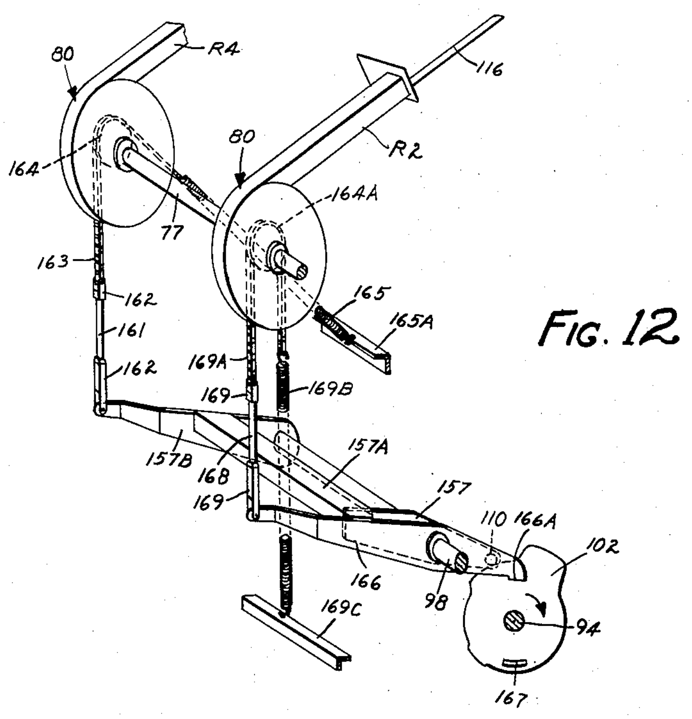
Figure 13:
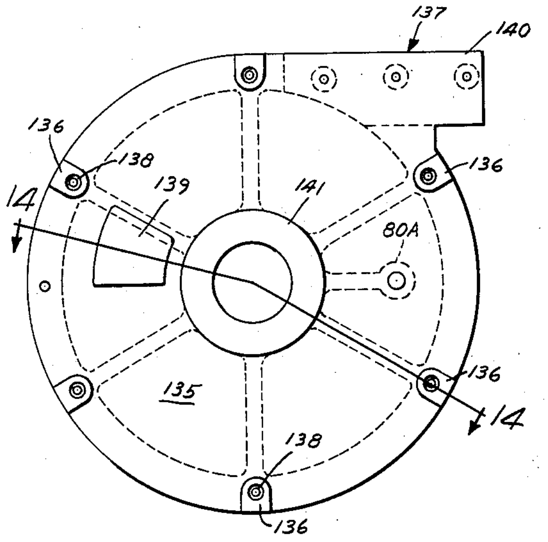
Figure 14:
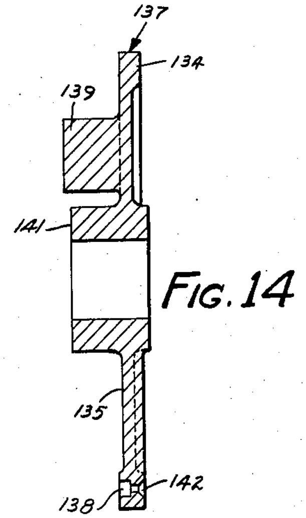
Figure 17:
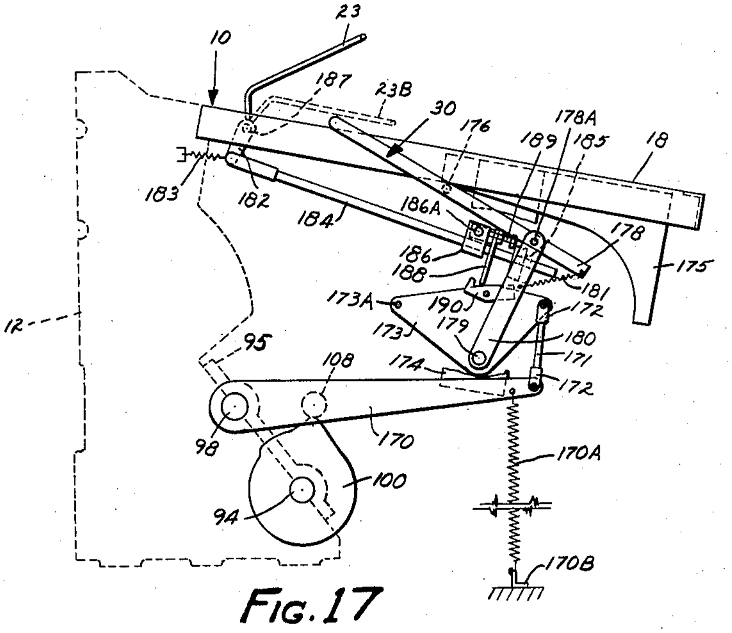
Figure 18:
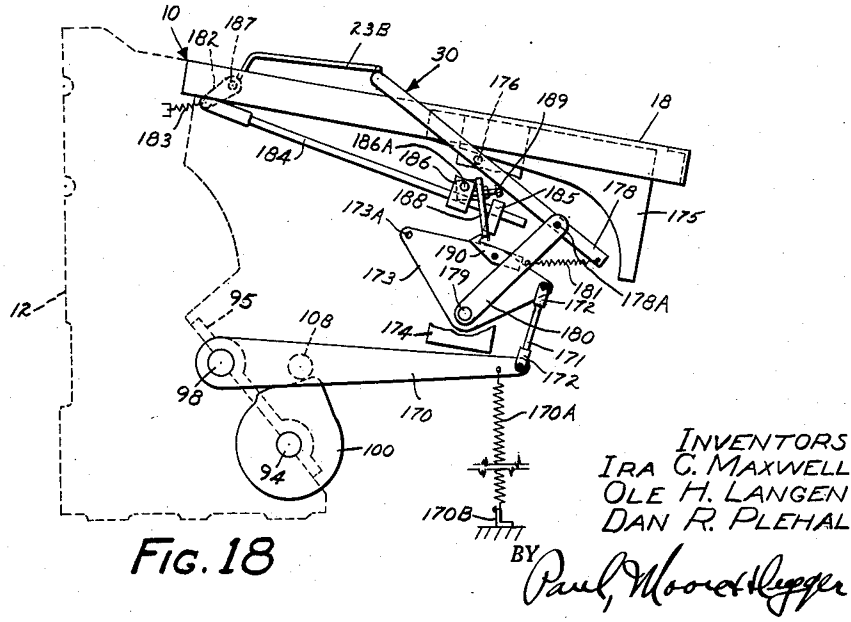
Figure 19:
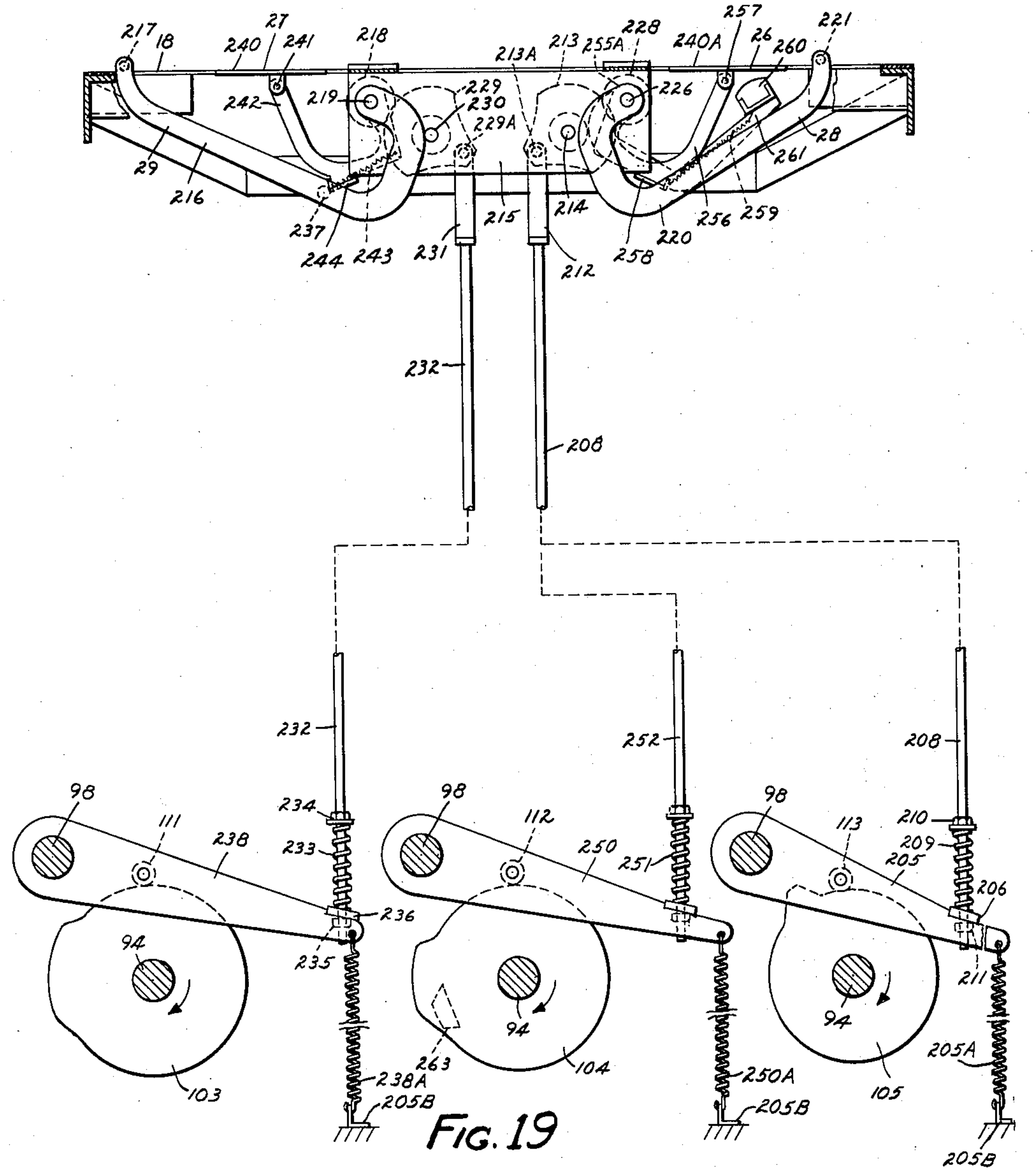
Figure 20:
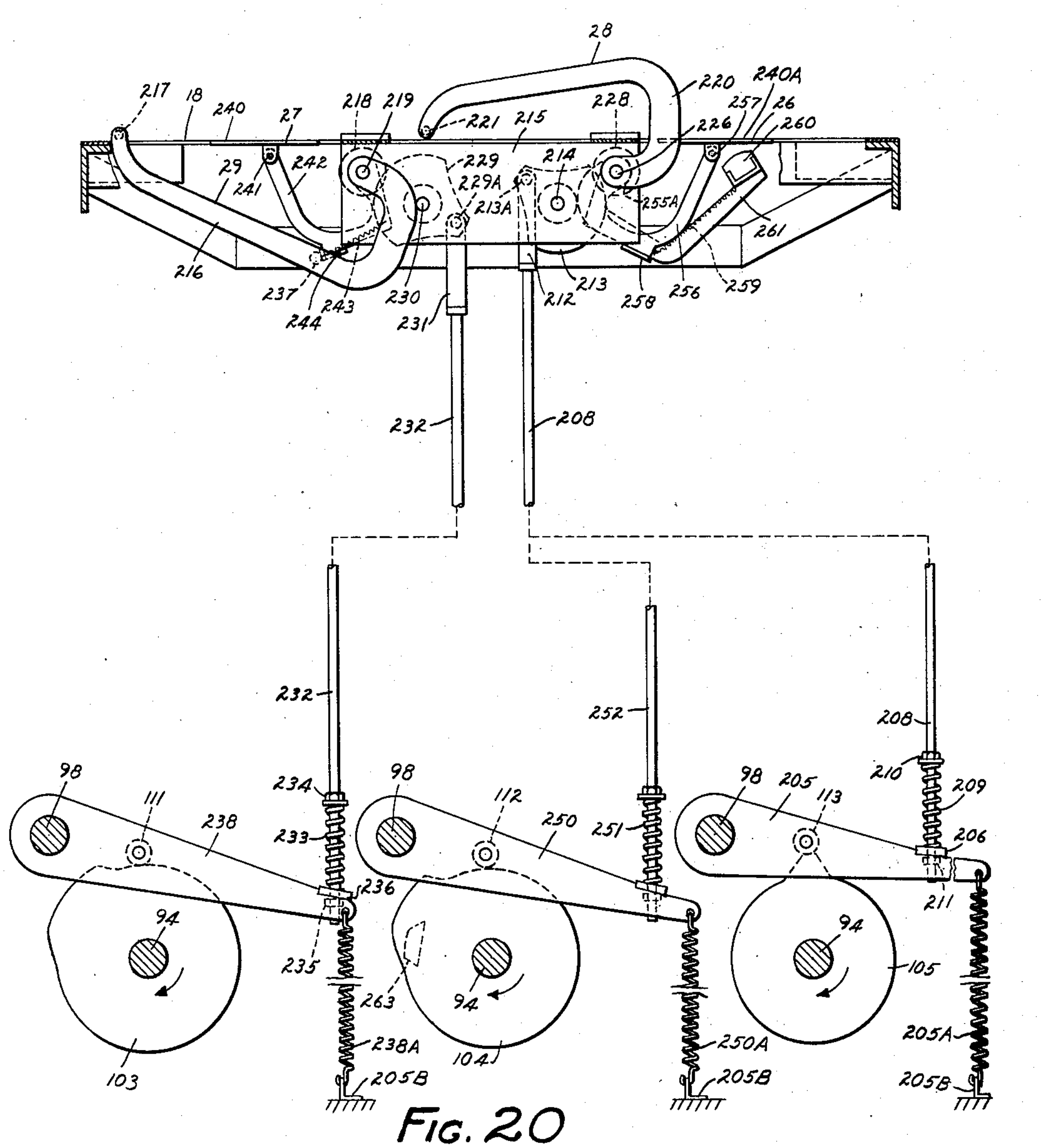
Figure 21:
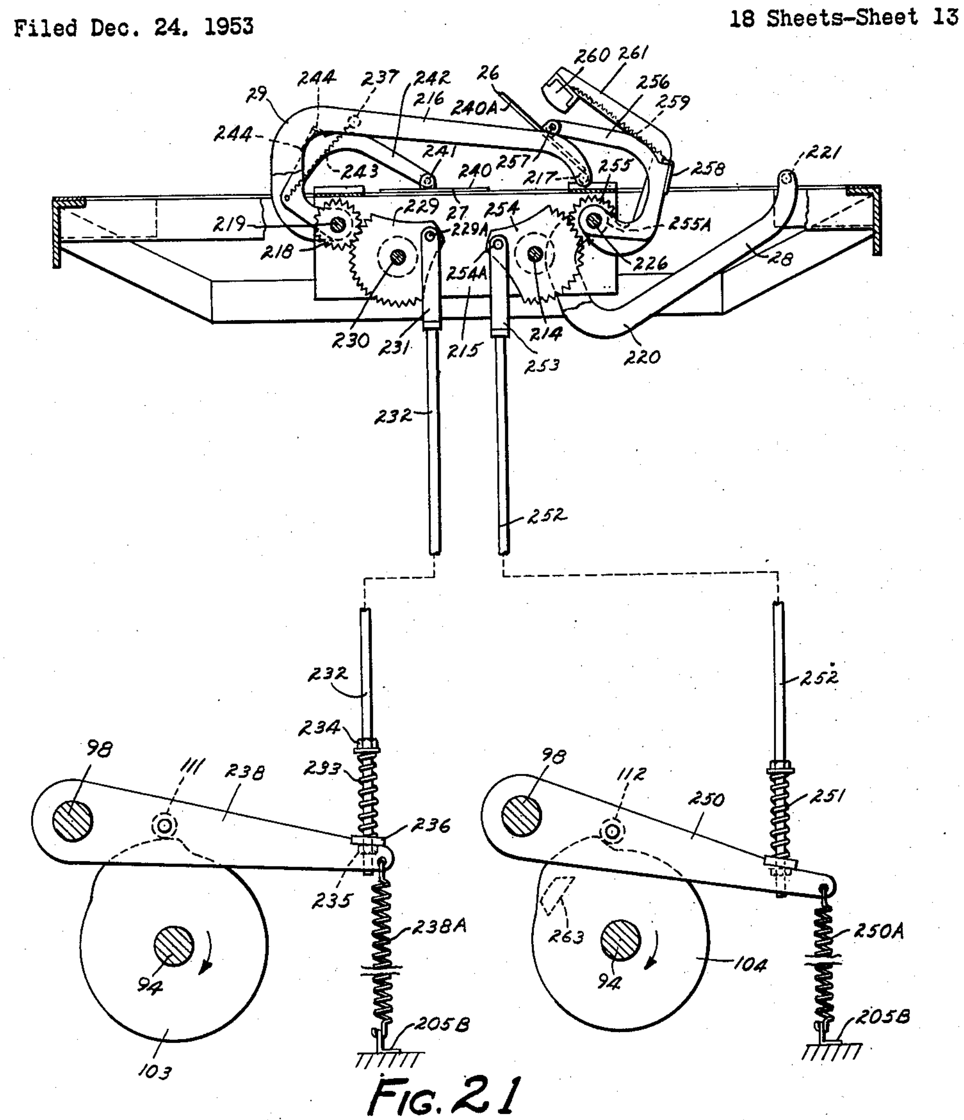
Figure 22:
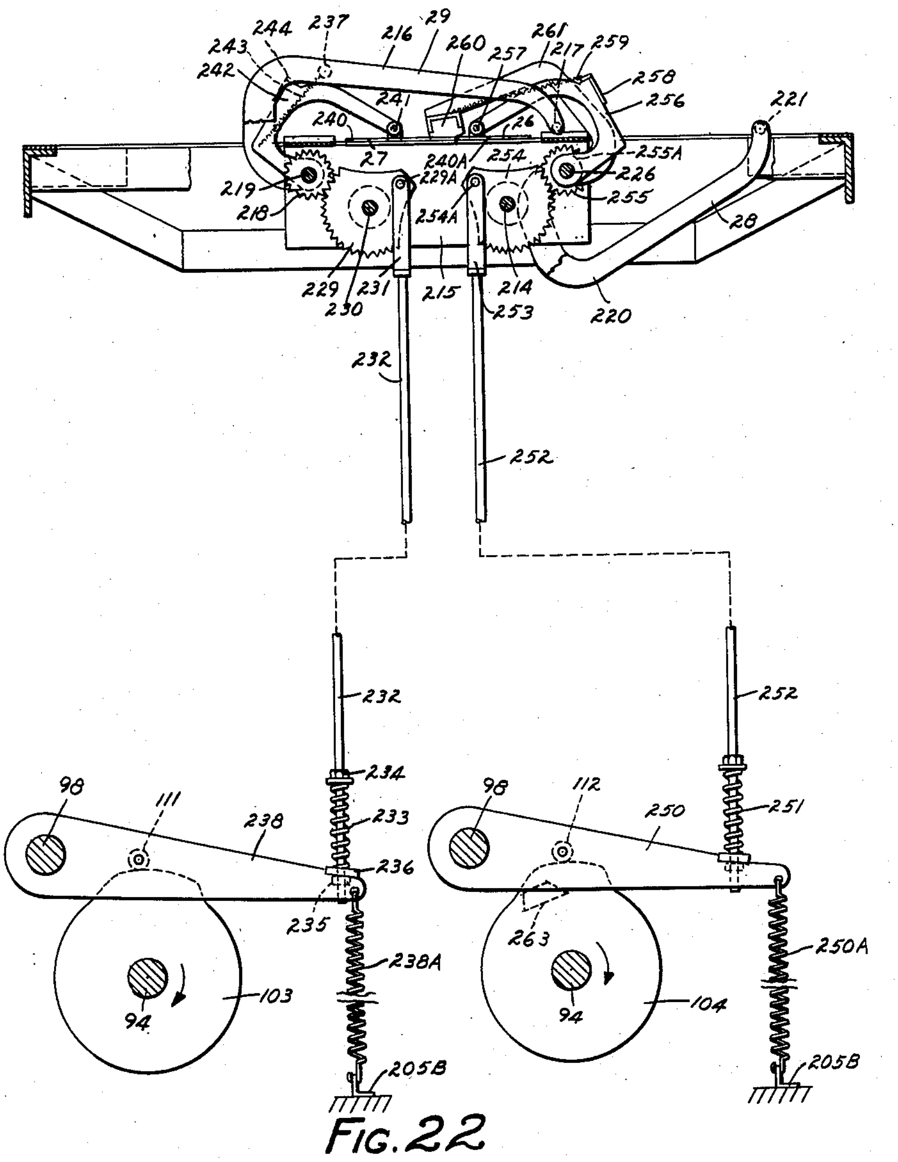
Figure 23:
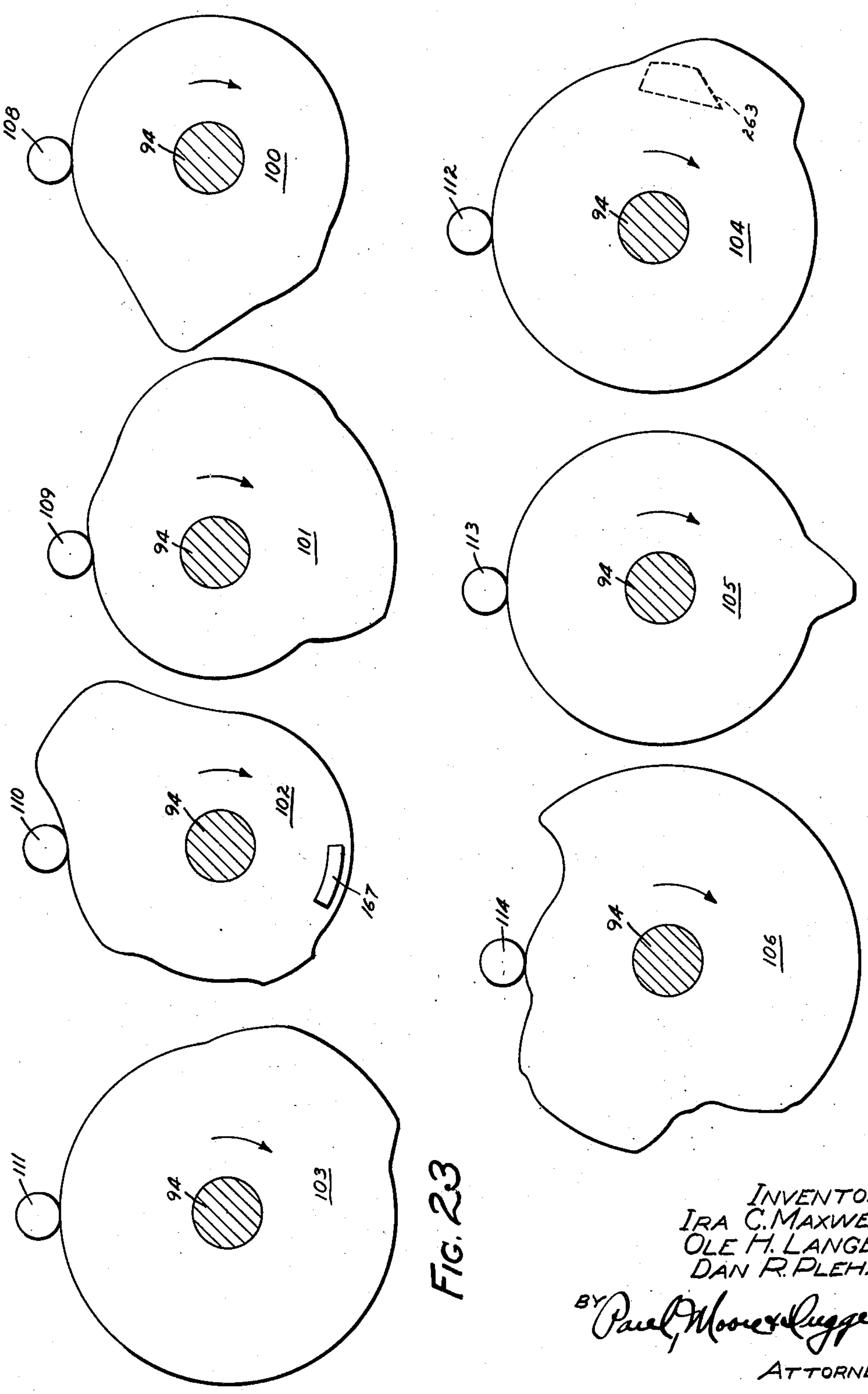
Figure 24:
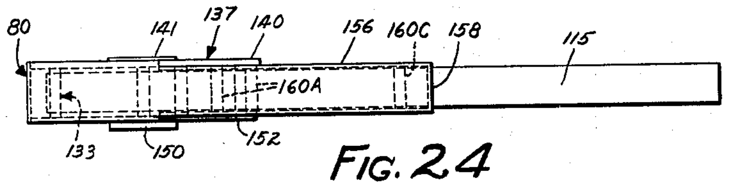
Figures 25, 25A, 26, 27, 28:
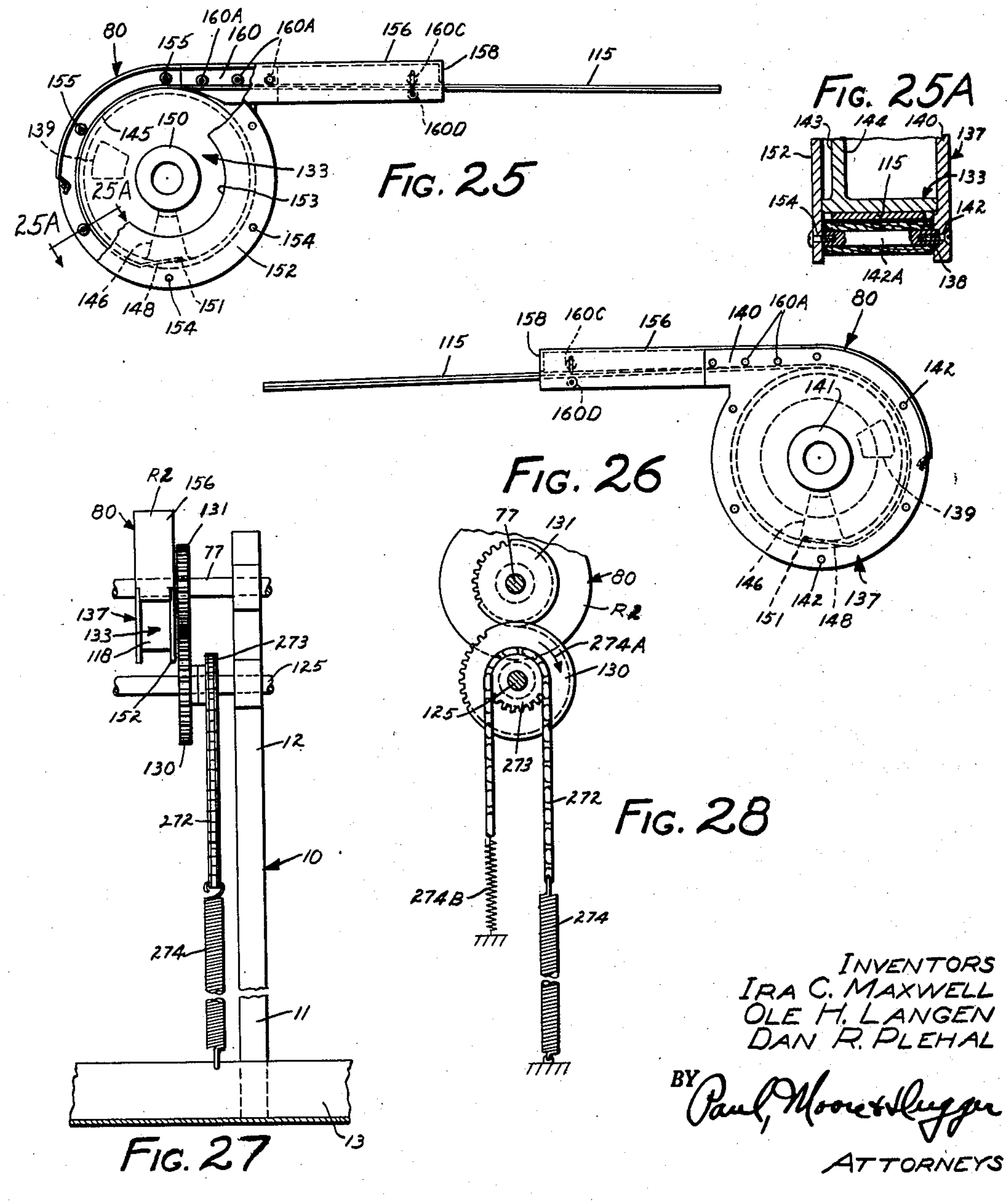

Figure 12 is an isometric schematic view of shirt retainer drums Nos. R2 and R4 and the mechanical elements for elevating and depressing the same;

Figure 13 is an end elevation of a drum plate, which is a part of each shirt retainer, Nos. R1, R2, R3, R4 and R5;

Figure 14 is a substantially vertical sectional view of the drum plate taken along the line and in the direction of the arrows 14—14 of Figure 13;

Figure 15 is a side elevation of one of the spools of the retainers of the instant invention;

Figure 16 is a view of the spool taken along the line and in the direction of the arrows 16—16 of Figure 15;

Figures 17 and 18 are related views;

Figure 17 is a side elevational view of the tail folding mechanism and hold clamps with the tail folder in operative position and the hold clamps ready to commence operation. In this view, these elements are shown separated from the remainder of the apparatus;

Figure 18 is a view similar to Figure 17 but showing the tail folder slightly retracted and the hold clamps in intermediate position preparatory to engaging a shirt;

Figures 19, 20, 21 and 22. In each of these views, each of the cams at the lower part of the figures are separated for better illustration, it being understood that in the actual device the cams are located side-by-side on the shaft 94;

Figure 19 is a vertical sectional schematic view showing the side folders and the flexible strip folders and fastener in rest position and mechanism for operating the same;

Figure 20 is a view similar to Figure 19 but showing the right side folder in folding position;

Figure 21 is a view similar to Figures 19 and 20 but shows the right side folder retracted and the left side folder in operating position, together with the flexible band folder mechanism operated to fold the left side of the band into engagement with the shirt and showing the right strip folder and sealer in position ready to begin its cooperative folding movement;

Figure 22 is a view similar to Figures 19–21 but shows the flexible band folders and sealer both in engaged position;

Figure 23 is a schematic elevational view of the cams separated and set side-by-side. The cams operate the folding mechanism. In this view the shaft 94 is shown in section and the cams and followers are shown in the positions they assume at the beginning of the cycle corresponding to the positions of the various elements in Figures 1 and 10;

Figures 24–26 are a series of related views showing the construction of one of the drums of shirt retainers Nos. R1–R5. These shirt retainer drums are all constructed alike and consist of a housing into and out of which a flexible tape which engages the shirt is adapted to be projected. The drum mechanism is rotatable arcuately as a whole to move the tapes (which are projected therefrom) into shirt engaging and shirt disengaging position. The illustrations in Figures 24–27 should be considered along with Figures 1, 3, 6, 7, 8, 9, 12, 13 and 14, which are related;

Figure 24 is a top plan view of one of the shirt retainer drums, (which is representative of any of the shirt retainers Nos. R1–R5);

Figure 25 is a side elevation partly broken away of the shirt retainer drum of Figure 25;

Figure 25A is fragmentary detailed sections at lines 25—25 of Figure 25;

Figure 26 is a side elevation of the shirt retainer drum of Figure 25, but shown from the opposite side;

Figure 27 is a fragmentary front elevational view of the means for rotating the spools which are housed within the shirt retainer drum, and which in this instance may be shirt retainers Nos. R2 and R4, the operating mechanisms for shirt retainers Nos. R1, R3 and R5 being similar.

Figure 28 is a fragmentary side elevational view of the apparatus illustrated in Figure 27.

Figure 29:
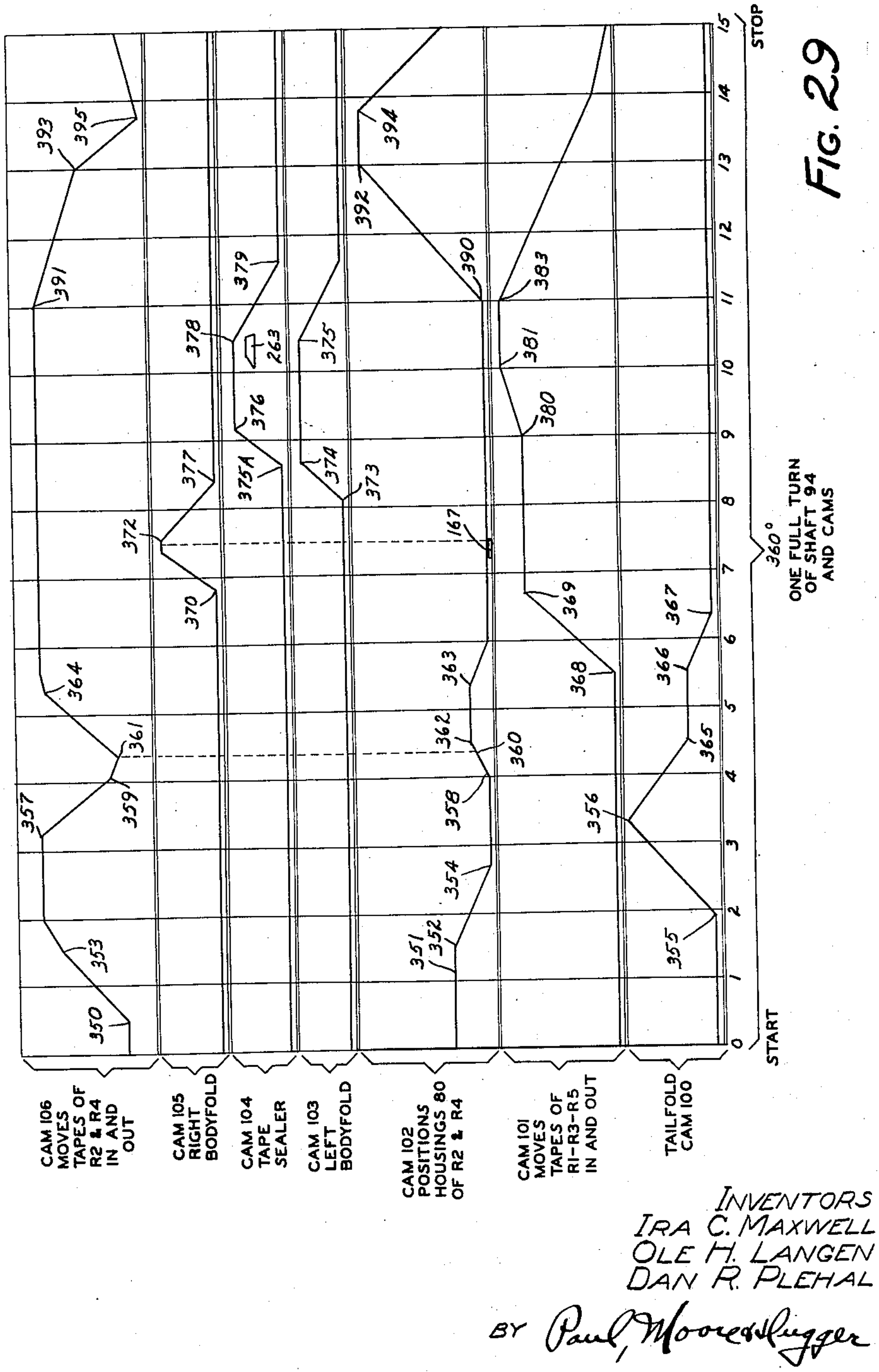

Figure 29 is a developed plan view of an exemplary form of cam sequence of the present invention for controlling the various folding mechanisms.

Figure 30:
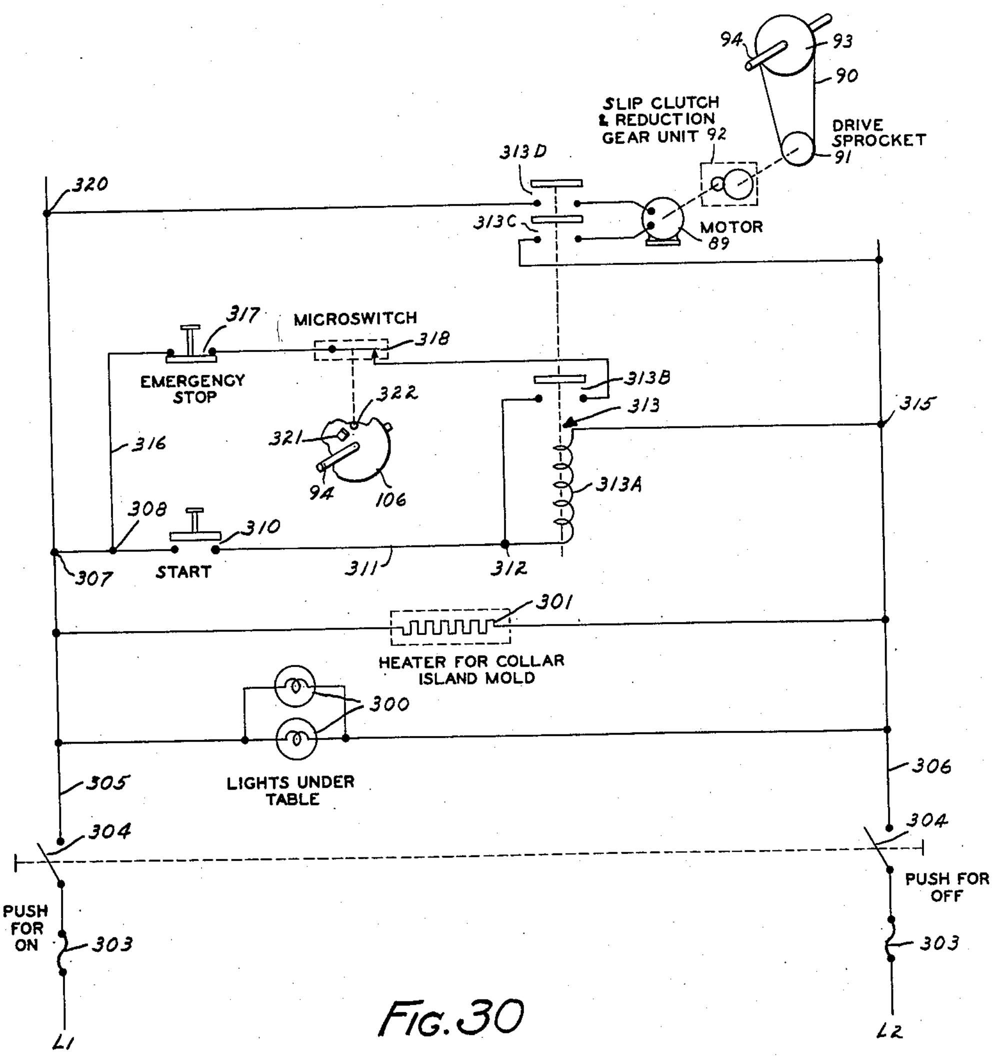

Figure 30 is a straight line wiring diagram of the electrical circuits and controls of the apparatus of the present invention.

Corresponding numerals refer to the same parts throughout the drawings and description.

The over-all plan of operation of the apparatus of the present invention assumes that a previously fully ironed shirt is available and ready to be folded. In the modern high-production laundry, the shirts are ironed by a crew of two or three (usually women) operators who complete the ironing of the shirt, utilizing a multiple unit battery of presses, which may, for example, include a one-lay sleeve press, collar and cuff press, yoke press, bosom press, or such other combination of presses as may be available. There is little or no hand finishing. The fully ironed shirt is then hung on a form and the collar and shirt front are buttoned. The cuffs of negligee shirts are usually left flat (unbuttoned), as are the cuffs of "French cuff" shirts. The operator then folds the shirt, and it is to this operation that the present invention is addressed.

With reference to the drawings forming a part of this application, the shirt folding table generally designated 10 comprises a bottom casting 11 and a top casting 12 (Figure 3) situated thereon and connected thereto. Bottom casting 11 is provided with a peripheral skirt 13 and feet 14 by which it can be set level. The entire mechanism is enclosed in a housing 15 having a removable back plate 16 as shown best in Figure 1, and a folding table surface 18 is provided as shown best in Figure 2.

Figure 2:
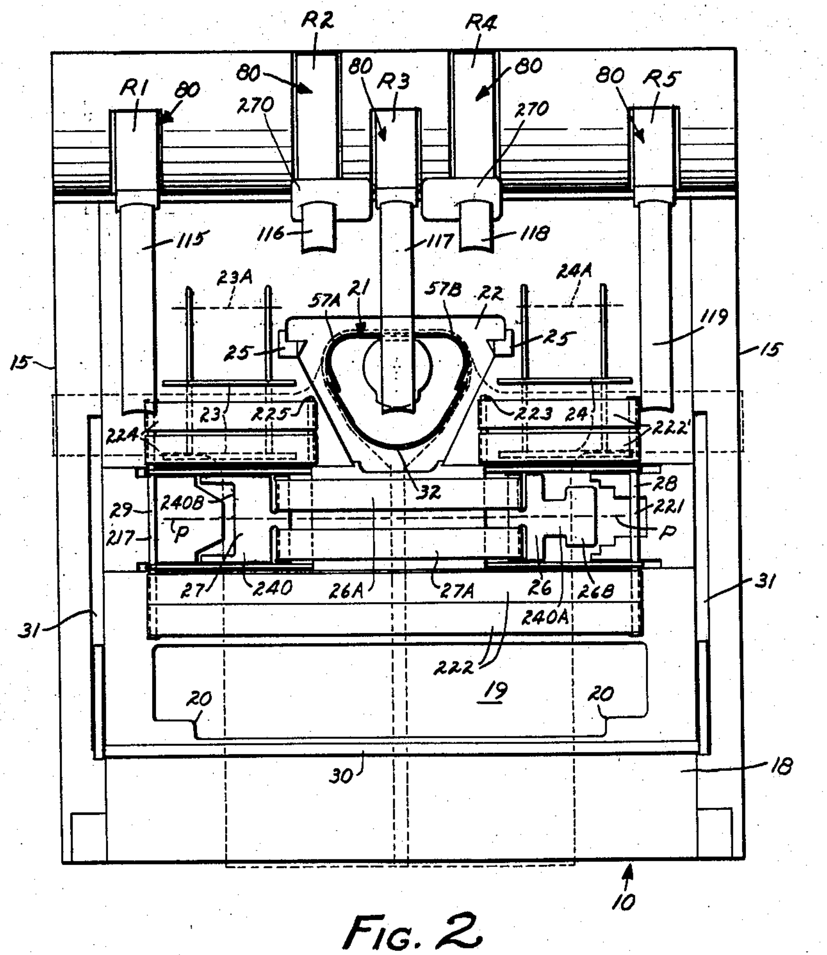
Figure 2 is a top plan view showing the apparatus of the invention in the starting or initial position.
Figure 3:
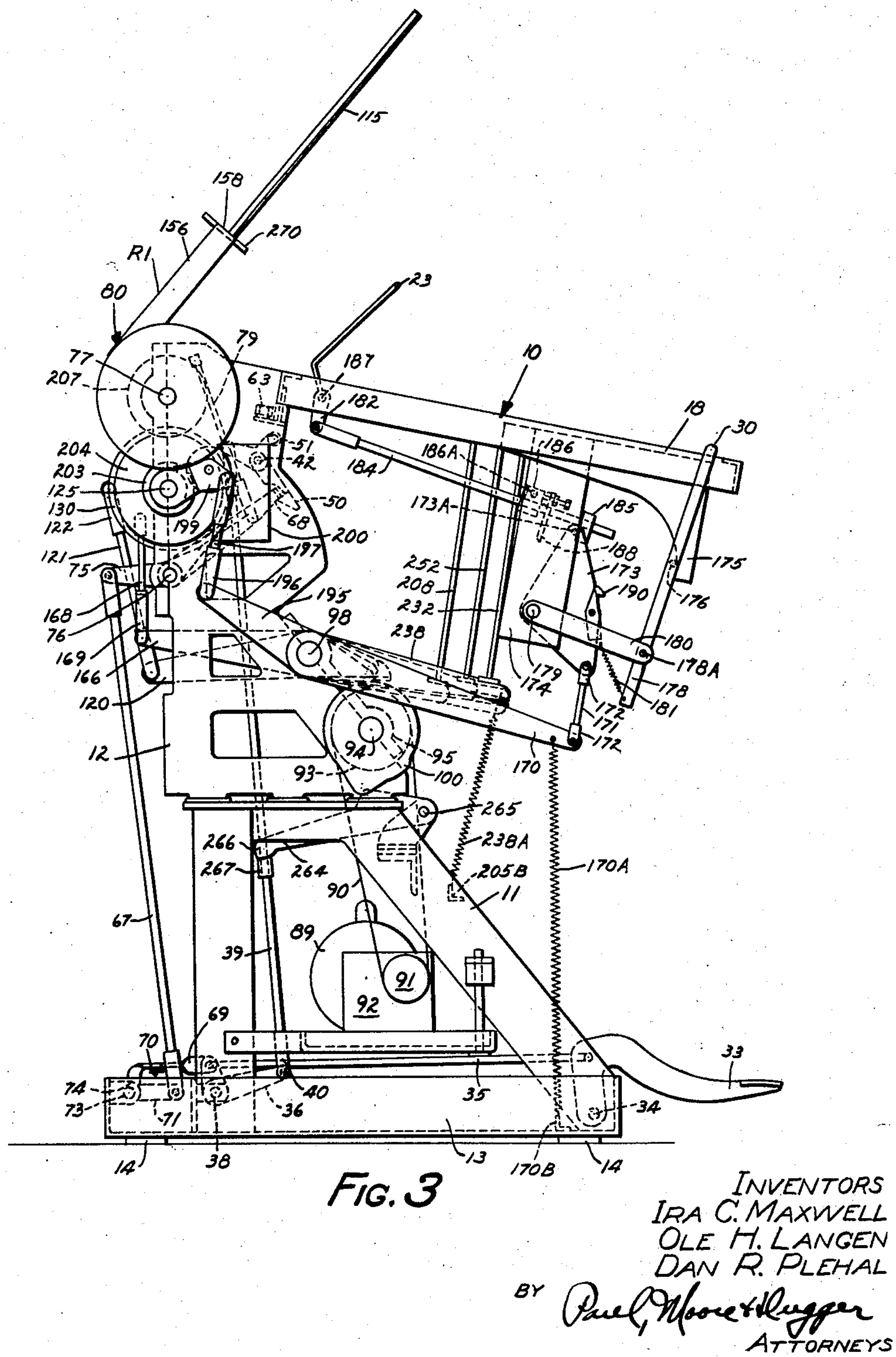
Figure 3 is a left side elevation similar to Figure 1, but showing the housing removed.

As is shown best in Figure 2, the folding table surface 18 is provided with a depression 19 having corner tabs 20 and in which a stack of flexible paper shirt retaining bands are placed. These paper bands are of the "self-adhering" type, consisting of paper having a tacky coating on the "top side" at the right end, and a similar tacky coating on the "bottom side" at the left end. These tacky coatings are insufficiently tacky to cause adherence between the coating and another uncoated paper surface; hence they can be stacked, but when the two coated surfaces are brought together adherence will occur, to lock the two ends together to form a band. The recess 19 is low enough so the bands are out of the way, but conveniently located. Also positioned on folding table 10 are five extending retaining members designated R1, R2, R3, R4 and R5. Positioned at the center of the table surface 18 is a collar form assembly generally designated 21 provided upon a depressed platform 22 and positioned between cooperating arcuately movable hold-down clamps 23 and 24. These clamps 23 and 24 (which are illustrated in Figures 2 and 3) are arcuately up and down about the axes 23A and 24A, through the operation of a foot treadle controlled by the operator, as will be described. A pair of upwardly extending clips 25 are positioned between clamps 23 and 24 and form 21 and serve to position the conventional shirt stiffening cardboard during the folding operation. These clips are springy enough to resiliently engage and hold the cardboard during the forming and folding of the collar.

Positioned between the collar form 21 and the front of the folding table is a right band folder 26 and a left band folder 27. Positioned adjacent the right and left band folders 26 and 27 are right and left side folders 28 and 29. The self-adhering paper shirt bands are placed, one for each shirt along the center line P—P, and brought up around the folded shirt as a final operation, by folders 26 and 27.

Positioned at the forward edge of the table is a tail folder 30 which operates in elongated apertures 31 as later explained.

The initial or rest position of the shirt folder is as follows: Retainers R1—R5 are in an elevated position of about 60° above table surface 18, shown for retainer R1 in Figure 3. The hold-down clamps 23 and 24 are likewise in the position of Figure 3, as is the tail folder 30. The side folders 28 and 29 and band folders 26 and 27 are in the position of Figure 2, that is, flush with the table. The collar form 21 is in expanded position. The steel bands of the retainers R1, R3 and R5 are extended and those for R2 and R4 retracted.

A shirt is then placed face downwardly upon the shirt folding table, with reference to Figure 2, with the collar buttoned and the collar positioned around form 21. Form 21 comprises cooperating collar surfaces which, taken together form a "band" or "island" 21, the edges of which are perpendicular to depression 22. The sides of this "collar island" 21 are contractable by the operator to permit the insertion of a collar downwardly around it with the collar in recess 22 around the island. An electrical heater element, not shown, is included in the collar island form so as to dry out any residual moisture in the collar.

Figure 1:
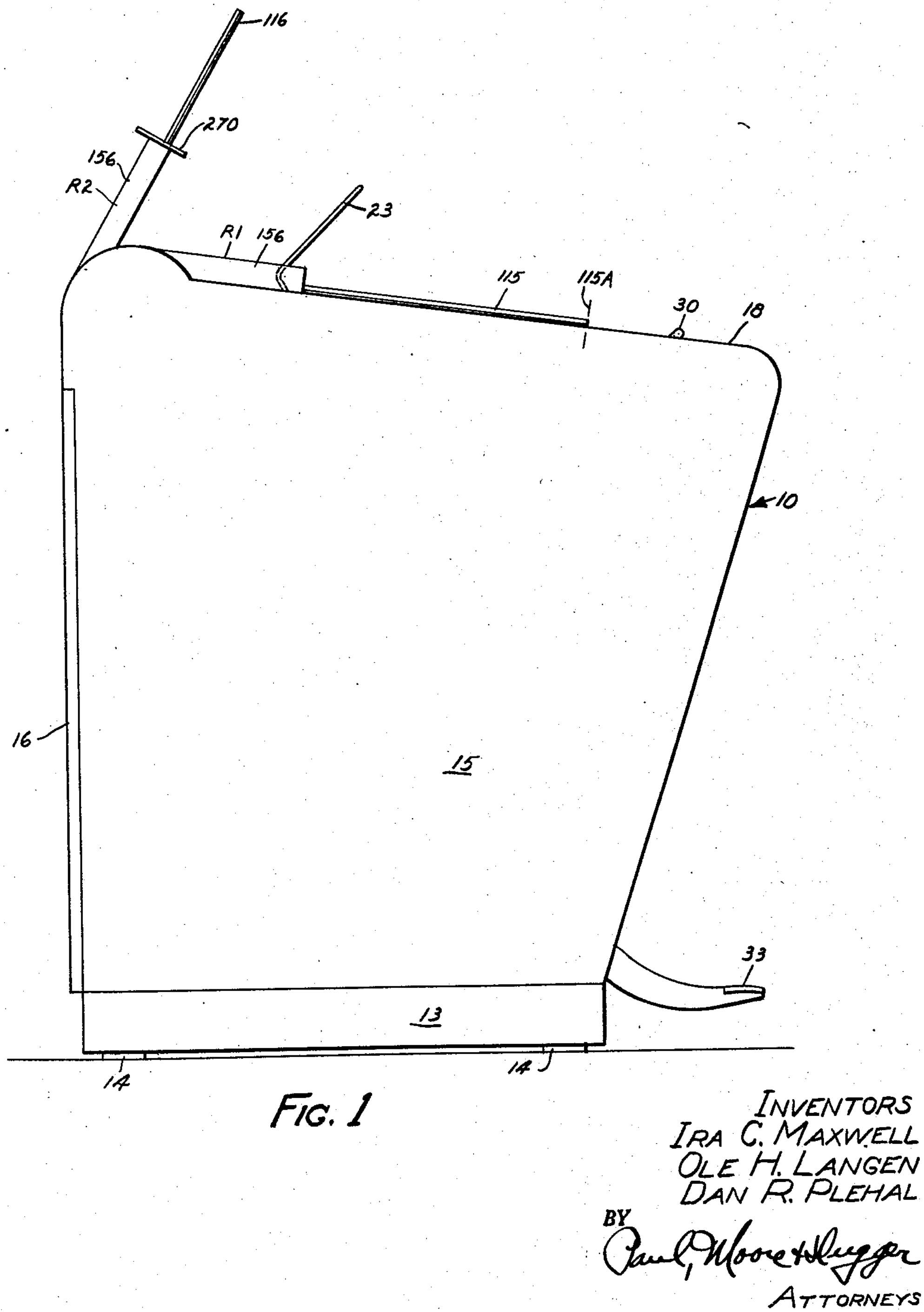
Figure 1 is a side elevational view of the apparatus of the instant invention shown from the left side.

When it is desired to insert the collar over collar island form 21, the foot pedal 33, shown in Figures 1 and 3, is depressed. Pedal 33 is pivoted at 34 to the frame 11. A link 35 is pivotally connected to pedal 33 and extends rearwardly to a bellcrank lever 36 pivoted at 38, as shown best in Figures 3–4 and 6. A collar form control rod 39 is provided with a clevis 40 at one end which is attached to bellcrank 36 and a member 40A at the other end which is attached to a second bellcrank 41, which is pivoted by pin 42 to clevis bracket 43, bracket 43 being supported by a pair of hangers 44 attached to the plate 45 secured by bolts to underside of frame surface 22. Bellcrank 41 comprises a pair of bellcrank levers separated by a hook spacer 50 and having a roller 51 pivoted thereto.

The entire collar form assembly 21 is rectangular in configuration, as shown in Figure 5, and is attached to cross braces 52 and 53 provided on the bottom side of the folding table surface 18.

Plate 45 is provided with a central recess in which slide bar 54 is positioned for reciprocation. Slide bar 54 also reciprocates in central recesses formed in yoke 55 and spring bracket 56. The yoke 55 has a substantially U-shaped cross-section as shown best in Figure 4 and is provided with longitudinal apertures 58 through which toggle members 59 are adapted to be connected to blocks 60 which are attached to collar mold surfaces 57A and 57B, and to reciprocate therein. Spring bracket 56 is of angular cross-section and is attached to the surface 22. It is also positioned to rest upon an angle support 61 attached to cross member 53.

Toggle members 59 are secured to the bottom of surface 22 by bolts 62 and in pivotal relation. Each of the ends of members 59 is bifurcated to receive the shank of a bolt, one of the ends of each of the members being connected to the shank of a bolt connecting it to one of the blocks 60 and the other end being connected to a bolt connecting it to slide bar 54.

Secured to slide bar 54 by a cap bolt 63 is a spring retainer 64 shown best in Figure 4. A tension spring 65 serves to join retainer 64 to spring bracket 56 and thus serves to draw the slide bar 54 and consequently the toggle members 59 to the position of Figures 4 and 5, in which position the collar mold 21 is expanded.

The collar island mold 21 is thus normally in expanded position and depressing of the foot pedal 33 operates to rotate bellcrank 41 in a counter-clockwise direction, as shown in Figure 4, whereupon roller 51 engages spring retainer 64 and pulls it leftwardly (in Figures 4 and 5, or towards the rear of the machine) thus stretching spring 65 and rocking toggle members 59 about pivots 62. This causes slide blocks 60 to move toward one another and consequently to bring collar form surfaces 57A and 57B toward one another. Collar mold surface 32 is also connected to slide bar 54 so that as the bar slides (to the left in Figures 4 or 5, or to the rear of the machine), surface 32 is likewise drawn in, consequently the three surfaces 57A and 57B and 32 forming the collar mold 21 are brought into contracted position, thus allowing a shirt collar to be positioned easily thereon. The spring 65 biases the parts to the "expanded" portion, thus tightly fitting the shirt collar, regardless of size, so as to frictionally grip the collar during the ensuing folding operation.

The rotation of bellcrank 41 also serves to rotate the integral hook spacer 50, having a stop 66 which is normally engaged by a pivot arm 68. The pivot arm 68 is thus released and free to pivot clockwise with respect to Figure 4.

Pedal 33 is also connected through bellcrank 36 to link 69 (Figure 6), which is asymmetrically connected to yoke 70, which is in turn connected to bellcrank members 71 and 72 which are pivoted on rod 73, secured to lugs 74 on the back of skirt 13. Cranks 71 and 72 are individually pivoted to move independently. Link 69 has a slot 69B which rides on pin 69A in yoke 70, at about the one-third position, that is, the part of yoke 70 to the left of pin 69A (in Figure 6) is about twice as long as the part to the right of pin 69A.

Referring now specifically to Figures 3 and 6, bellcrank 71, which is pivoted on the frame at pivot shaft 73, has its short lever arm connected to the left end of yoke 70, and has its long lever arm attached by rod 67 to crank arm 75 keyed to shaft 76. Shaft 76 is journaled in the frame. Positioned on shaft 76 for integral movement therewith are a pair of drum release levers 78—78, which through connecting rods 79—79 are affixed to drum plates 80—80 of shirt retainers R1 and R5. The drums are of the form shown in Figures 15 and 16 and are partially covered by a sub-assembly made up of a plate 137 at one side which is of the form shown in Figures 13 and 14 and a tape guide 156. The necessary bolts hold the sub-assembly 137—156 together and the tapes 115, 117 or 119, which are fastened to the spools 133, are guided by rollers placed on spindle bolts at holes 138 around drum plate 137 (see Figures 13 and 24–26). The spools 133 for retainers R1, R3 and R5 are keyed to shaft 77, but the sub-assemblies 137—156 are not keyed to shaft 77 and are free to rotate thereon.

Each of the drum assemblies 137—156 of retainers R1, R3 and R5 is located by a collar on shaft 77 and each is biased by a spring (81R1, 81R3 and 81R5) to rotate in the direction of arrows K, but the rotary motion of each in such direction is limited with respect to its spools 133 by cooperating stops on the drum plates 137 and stops on the spools 133. Thus, on the inside of each drum plate 137 is a stop 139 (see Figures 13 and 14). Similarly, the spools 133 (of shirt retainer drums R1, R3 and R5, but not of retainers R2 and R4) contain a cooperating stop 146. When the drum plates 137 are assembled against the spools 133, the stops 139 and 146 will abut and they are so located that the rotation of each of the drum plates 137 (in direction of arrows K) will bring its stop 139 against the stop 146 of the spool and hence the guides 156 carried by drum plate 137. Hence, the arcuate position of drum plate 137 and guide 156 will be controlled in each case by the position of the corresponding spool 133, which is in turn positioned by links 79—79 or 80, and the levers, harness and foot pedal 33.

It is noted that the foot pedal 33 is for "letting down" the shirt retainers R1, R3 and R5 (and also operating the collar form 21). The machine automatically raises the shirt retainers R1, R3 and R5 at the end of a cycle of operation, nad the retainers are held in the raised position by catch 66—68 (Figures 4 and 6), which operates through pedal 33, in conjunction with the control of collar form 21.

To the side plate 152 of left hand drum assembly 80 of retainer R1 is attached a tension spring 81R1 (see Figure 6), the other end of which is attached to a portion 82 of the upper frame member 12. Similar springs 81R3 and 81R5 serve the assemblies of retainers R3 and R5. These springs serve normally to bias the retainers R1, R3 and R5 in a clockwise direction as shown in (arrows K) Figure 6. It may be noted at this time with reference to Figure 6 that the arms 68 and 78 are fixedly attached to shaft 76 for pivotal movement therewith. Also, a spring 78A is attached to arm 78 that is keyed on shaft 76 and biases the shaft and arm arcuately in the direction of arrow L and since levers 68 and 78 are also keyed to shaft 76, this whole assembly tends to move in direction of arrow L. This tends to rotate each of the drum plates 137 of R1 and R5 in the direction of arrow K, but motion is limited by the linkages ultimately terminating at pedal 33, which in turn stops against frame 13.

Similarly, spring 84A attached to lever 84 on tubular shaft 85 biases that lever (and hence drum plate 137 of retainer R3 controlled by it and rod 83 and bellcrank 72) in a direction corresponding to arrow M (adjacent lever 84, Figure 6). Motion in this instance is limited by stop 72A under lever 72. Note that bellcranks 71 and 72 may pivot independently within the limits imposed by the yoke (singletree) 70 and the slot 69B and pin 69A and stop 72.

To bellcrank 72 is connected rod 83, which is in turn connected to rocker arm 84 affixed to sleeve 85 (which journals on shaft 76). To the other end of tubular shaft 85, there is connected a lever 86 having an end adapted to engage the upper surface of the arm 68. Arm 84, sleeve 85 and lever 86 all form one integral member which rotates on shaft 76. Shaft 76 is journaled in the frame. Thus, sleeve 85, rocker arm 84 and lever 86 as a unit are free to rotate relative to shaft 76, but arm 86 has a pin 86A on it, which bears against arm 68. To the other end of rocker arm 84 is connected rod 88, which in turn is connected to crank pin 80A on drum plate 137 on the outside of the assembly 80 of central shirt retaining member R3.

As aforementioned, the action of treadle 33 is first to retract the collar form 21 and this action unlatches catch 66—50 which meanwhile has held the linkages in a position such that R1, R3 and R5 are elevated. However, when treadle 33 is pressed, this action acts to sustain and hold R1, R3 and R5 in their elevated position and it is not until the operator retracts (releases pressure upon) treadle 33, that R1, R3 and R5 are lowered. When thus released, R1 and R5 move arcuately downward until engaging the shirt, spread out on the table and the collar form 21 simultaneously grips the collar, as previously explained. Then (after the operator has manually folded the arms of the shirts so as to position the flat cuffs centrally along the back of the shirt) further release of treadle allows R3 to swing down and this holds the cuffs. This action (as shown in Figure 6) is brought about as follows:

The depression of treadle 33 has unlocked catch 66—50. Springs 81R1, 81R3 and 81R5 in each instance rotate the drum plate 137 of the retainer until its stop 139 (Figures 13 and 14) engages the stop of 146 of its spools 133 (Figures 15 and 16). Hence, pressure of the springs 81R1, 81R3 and 81R5 are imposed upon the respective annular side plates which are in turn connected to drum plates 137, but the drums do not rotate until allowed to do so by links 79—79 and 88. Spring 84A (Figure 6) pulls on lever 84 and preferentially moves links 88 and 83 until bellcrank 72 bottoms on stop 72A to elevate R3. Stop 72A is so located that when thus bottomed, R3 is held elevated. Hence, as treadle 33 is raised and allows link 69 to recede rearwardly (of the machine), the right end of single-tree yoke 70 (as shown in Figure 6) remains fixed and the left end swings rearwardly as shown by arrow P, thus allowing bellcrank 71 to rotate as shown by arrow R. This preferential action is accentuated due to the fact that pivot 69A of lever 70 is off-center to the right, as shown in Figure 6. This action rotates lever 75, shaft 76 and levers 78—78 in the direction of arrow L, thus permitting drum plates 137—137 on drums 80—80 of R1 and R5 to rotate (clockwise as shown in Figure 6, that is, in the direction of arrow K), and shirt retainer drums R1 and R5 are rotated arcuately downwardly into shirt retaining engagement. This, in effect, stops the motion of the left end of single-tree yoke 70, and as the treadle 33 is further released, the yoke 70 then begins to pivot about its left end (as shown in Figure 6), thereby swinging its right end in the direction of arrow Q. This lifts the long arm of bellcrank 72 off the stop 72A, and lever 84 is moved arcuately in the direction of arrow M until R3 moves into engagement with the shirt (at the back center line), in which position the cuffs have been placed by the operator. Note that lever 68 has moved down and out of the way of pin 86A, which swings down as lever 84 and shirt retainer R1 move down. Pin 86A clears the lever 68 by a little bit in this position, for they are ineffective until the (power controlled) lift, at which time lever 68 in moving upwardly engages pin 86A and raises R3 at the same time as R1 and R5 are being elevated.

For clarity, brief reference will be made at this juncture to the mechanism for retracting the steel retainer strips 115 of R1, 117 of R3 and 119 of R5 and for rotating the retainers arcuately upward to the Figure 1 position, which is the start and stop point of the cycle. Each of the spools 133 of retainers R1, R3 and R5 is keyed to shaft 77. The strips 115, 117 and 119 are fastened to and are wound each upon its spools 133, within the confines of the guides in the housing 137—156. The shaft 77 is biased in the direction of arrow S (Figure 6) by sprocket 282 over which a roller chain 281 is draped. One end of chain 281 hangs free (or is held by a weight or very light spring, as shown in Figures 6 and 28), but the other end is pulled by spring 280, anchored to the machine frame. Thus, shaft 77 and all of the spools 133 keyed thereon will rotate so as to project the strips 115, 117 and 119 when the mechanism permits. Rotation of shaft 77 is accomplished by means of cam-power, utilizing the mechanism of Figure 7, which is shown schematically at the right end of shaft 77 in Figure 6. It will be understood that this cam-power mechanism and spring return gear are located along shaft 77 at convenient places, but in Figure 6 they are shown off to one side for clarity. As cam 101 rotates, it swings lever 195 about its pivot 98, thus pulling on rod 197 so as to swing lever 199 which pivots on shaft 125. Lever 199 carries gear 202 which meshes with arcuate rack 200, thus rotating that gear. Gear 202 meshes with and rotates gear 203; the latter rotates gear 204 and gear 204 rotates gear 207 connected to shaft 77. The motion is such that shaft 77 rotates spools 133 in a direction to retract the strips 115, 117 and 119 by winding them inwardly through guides 156. The shirt retainer drums of R1, R3 and R5, composed in each instance of drum plates 137 and guide 156, with necessary guide rollers, etc., are meanwhile held in a downwardly rotated (shirt holding) position and the strips 115, 117 and 119 are therefore simply retracted inwardly. However, coincident with full retraction of strips 115, 117 and 119, or at a selected place during retraction, the stops 146 of spools 133 (Figures 15 and 16) engage the cooperating stops 139 of drum plates 137 (Figures 13 and 14) and the drum plates 137 (and guides 156, etc. which collectively constitute the shirt retainer drums 80) of each shirt retainer R1, R3 and R5 are then rotated counter-clockwise (contrary to arrows K, Figure 6) to the fully raised position. During this time, latch 66 slips under the catch on lever 50 and when the cam 101 rotates (to a low point on the cam freeing roller 109), the shirt retainers R1, R3 and R5 are held elevated.

Thus, to fold a shirt, a flexible paper band having cohesive ends is placed on right and left band folders 26 and 27 along line P—P, foot pedal 33 is depressed, the collar is then placed on the collar mold 21, and as the pedal 33 is released the mold 21 expands to retain the collar and retainers R1 and R5 move into position to engage the shirt on surface 18. The arms are then folded in over-lapping relation around retainers R1 and R5 and at a position beneath the impact point of retainer R3. Retainer R3 is then allowed to bottom on surface 18 and the shirt is thus maintained in position.

Before the arms are folded inwardly, however, the conventional shirt cardboard is then inserted with its forward ends under clips 25 so that the shirt will be folded therearound.

The remainder of the folding operation is entirely automatic, being entirely mechanically actuated from cams on a motor driven shaft. The shaft (and cams) makes one cycle of folding motions, each a complete revolution and come to rest at a stopping position. The motor drive is electrical and will be further explained hereafter. An electrical connection is now established to start motor 89, which is provided with a chain drive 90 driven by a sprocket 91 connected to a reduction gearing 92, including an overload clutch. The overload clutch is provided to disengage whenever the automatic mechanism misfunctions and jams so as to prevent damage to the machine and garments being folded. As mentioned, the cam drive stops at a certain position which marks the end of a folding operation and also is the ready position for the next cycle, all as illustrated in Figure 3. Motor 89 is provided with a self contained overload slip-clutch and with a reduction gear terminating at output sprocket 91. The chain drive 90 serves to drive a sprocket 93 affixed to cam shaft 94. Cam shaft 94 is supported, as shown in Figures 3 and 10, by a pair of duplex bearing blocks 95 and 96 which also serve to support the cam follower shaft 98. Blocks 95 and 96 are attached to the upper casting 12 by any suitable means, as shown in Figure 3, and provide bearing surfaces for shafts 94 and 98.

Affixed to shaft 94 for rotation therewith is a plurality of cams 100–106, Figures 10 and 23, the individual operation of which will be more fully explained later. Each of the cams is provided with a follower as shown in Figure 10 and which followers are shown diagrammatically with reference to Figure 23. When the shirt folding table has completed one cycle of operation and is in the rest position, the cams 100–106 and the followers 108–114 are in the position shown in Figure 23.

As the cam shaft 94 commences to rotate, each of the cams 100–106 will rotate in the direction of the arrows of Figure 23 from its initial or rest position and rotation continues through one complete revolution and halts in the same position. Rotation of cam 106 will first cause the bands 116 and 118 for retainers R2 and R4 to extend as the displacement of the cam follower 114 pivots the follower arm 120 about shaft 98 (Figure 8). At this time, it may be mentioned that each one of the cam followers is provided with a follower arm pivoted about shaft 98, all substantially identical, and will not therefore be further explained other than with reference to follower arm 120, except in the instance of slight differentiating features. It will be understood, however, that the cam followers operate various mechanical movements requisite to the shirt folding sequence.

To the extending end of follower arm 120 of cam 106, as shown best with reference to Figures 8, 11 and 11A, is attached a rod 121 having a clevis 122 at each end thereof. One of the clevises is pivotally attached to arm 120 and the other is pivotally attached to a rocker arm 123 loosely attached to shaft 125 and having a spur gear 124 pivoted to the other end thereof. Attached to the frame 12 and supported by a spacer 126 therefrom is a concave arcuate gear rack 128 which cooperates with gear 124 pivoted on rocker arm 123 to rotate gear 124 as rocker arm moves arcuately about shaft 125. Gear 124 engages spur gear 129 keyed to shaft 125. Also keyed to shaft 125 are two larger spur gears 130, one for each of the units R2 and R4. Gears 130, in each unit R2 and R4, mate with a gear 131 which is journaled on shaft 77. For each unit R2 and R4, gear 131 is keyed to the spool 133 and rotates it. Hence, as cam 106 of retainer R4 moves the mechanical linkages and gears (of Figure 8), the spools 133—133 of the shirt retainer drums R2 and R4 are moved simultaneously in unison.

It may be noted at this time that only drum 80 of retainer R4 is shown in Figures 8 and 11. However, drum 80 of retainer R2 is provided with a spool 133, as aforesaid, keyed to its gear 131, and the spool 133 and gear 131 (of retainer R2) is journaled on shaft 77.

Thus, the spools 133 for the drums 80 of retainers R2 and R4 will rotate as a unit so that the tranversely bowed flexible bands 116 and 118 for retainers R2 and R4 will be extended from or be retracted into their drum assemblies 80 in unison.

Each one of the spools 133 and drums 80 for retainers R1—R5 are substantially identical and will therefore be described with reference to retainer R1. Such differences as there are will be noted as the description proceeds.

Thus, referring to Figures 13, 14, 15, 16, 24, 25 and 26, there is shown the drum 80 comprising a circular face plate 137 having an exterior face 134 and an interior face 135. Face 135 is provided with a plurality of projecting bosses 136 having apertures 138 therein (see Figure 13). Face 135 is also provided with a segmental stop 139 and a tangential extension 140, to which guide 156 is attached. Face 134 has a boss 80A thereon, to which the rods 79—79 and 88 are attached in units R1, R3 and R5. These bosses are not used in retainers R2 and R4. Plates 137 of retainers R1, R3 and R5 have stops 139 for drums 80, but plates 137 of retainers R2 and R4 do not. A short integral center hub 141 serves to journal the plate 137 on the shaft 77. The exterior face 134 of plate 137 is provided with a plurality of countersunk screw holes 142 which lead into apertures 138, which are counter-drilled on face 135.

The spools 133 of drums 80 which cooperate with the plates 137 are shown in Figures 15 and 16. Each spool comprises hub 150, an outer face 143, an inner face 144 and a rim 145. Spools 133 for retainers R1—R5 are provided with a segmental stop 146, but these stops are effective only in respect to units R1, R3 and R5. Each spool 133 is also provided with a saw slot 148 having a countersunk screw hole 149 therethrough for attaching the inner end of the spring steel strips 115, 116, 117, 118 and 119. Spools 133 for retainers R2 and R4 are journaled loosely on shaft 77, but spools 133 for retainers R1, R3 and R5 are keyed or otherwise secured to the shaft 77.

Referring now to Figures 13–16 and 24–26, the plates 137 and spool 133 are assembled so that their inner faces 135 and 144 respectively are directed toward each other and so that the inner machined surface of hub 141 of plate 135 and inner machined surface of hub 150 of spool 133 abut. Each one of the flexible (transversely bowed) steel bands 115 through 119 (shown as band 115 for retainer R1 in Figures 24–26), has its end 151 slightly bent so as to extend into the saw slot 148 where it is firmly secured by a screw threaded into hole 149. The flexible steel (transversely bowed) band is wrapped around rim 145 of the spool 133.

An annular side plate 152 having a central aperture 153 covers the outer face of spool 133 and is secured to plate 137 by screws passing through holes 154 in plate 152. As shown in Figure 25A, pins 142A serve as spacers between plates 152 and 137. These pins 142A seat in the counter-drilled holes 138 (Figure 14), where they are held by screws entered into the pins from the other side of plate 137. Plate 152 is fastened by screws to the opposite ends of the pins 142A. The pins 142A are highly polished and also serve as stationary pintles on which self-lubricating wooden rollers are journaled for guiding the steel tape as it is wound or unwound. A guide housing 156 of downwardly open U-shape cross-section and having a forward face 158 is fastened to the plate 137 and forms a tangential chute extending from plate 137. The guide 156 guides the tapes 115 (Figure 25) and determines its position. The guide 156 is provided with an anchoring extension 160 which is attached to extension 140 of plate 137 by screws, which again fasten into pins serving as journals for guide rollers. These are shown at 160A—160A, and, with guide roller 160C and fixed pin 160D, guide housing 156 serves to guide the flexible band 115 on its tangential path outwardly and inwardly through guide housing 156, as shown best in Figure 25. Hence, it will be seen that plate 137 and annular plate 152 together with housing 156 provide a receptacle or housing in which the flexible bands, such as 115 for retainer R1, are adapted to operate as they are wound and unwound on spools 133.

In the instance of spools 133 for retainers R2 and R4, the gears 131 are secured thereto by any conventional manner for rotation therewith.

With reference now particularly to Figures 27 and 28, there is shown a spring return system by which the flexible bands of retainers R2 and R4 are returned. This system includes a chain 272 passed over a sprocket 273 keyed to a jack-shaft 125 for rotation therewith, the shaft 125 being journaled in the machine frame. To chain 272 is attached a tension return spring 274 which has its other end attached to the frame 11 for normally biasing sprocket 273 and the shaft 125 in a clockwise direction, as shown by the arrow 274A in Figure 28, and thus for normally biasing the spools 133 for retainers R2 and R4 in a counterclockwise direction, with reference to Figure 28, to retract the flexible bands. A weak spring 274B connected between the free end of chain 272 and the frame is not strong enough to oppose spring 274, but keeps the chain 272 from dangling free. The biasing movement is utilized as follows: On shaft 125 there are keyed two gears 130, one for each of the retainers R2 and R4. These gears 130 mesh with gears 131 keyed to the spools 133 for retainers R2 and R4. Hence, as the spring 274 rotates shaft 125, it will bias all spools 133 geared to it.

As the cam shaft 94 (Figures 8, 10, 11, 11A and 23) begins to rotate, it rotates cam 106 in the direction of the arrow which displaces the follower 114, which in turn rocks arm 120, pulling down on rod 121 to rock arm 123, which by the action of rack 128 rotates gear 124 to rotate gear 129 on shaft 125, which through rotation of each gear 130 rotates each gear 131. Gears 131 are affixed to spools 133 for drums 80 of retainers R2 and R4 and consequently the bands 116 (of R2) and 118 (of R4) (see Figure 2) are extended each time shaft 125 is rotated. The return of the bands is via the spring return mechanism of shaft 125, previously described.

The movement of the drum assemblies 80—80 of retainers R2 and R4 is as follows: Referring to Figures 2, 10 and 12, to shaft 98 there is attached a rocker arm 157 having a roller 110 which rides the edge of cam 102. The arm 157 also extends forward. Another spaced rocker arm 157B, parallel to 157, is provided in spaced relation along shaft 98 and the two arms 157 and 157B are connected across their front ends by an angle bar 157A. Hence, as arm 157 is rocked, the whole assembly 157—157A and 157B rocks. Arm 157B controls the housing of unit R4. On shaft 98 is also pivoted another arm 166 which is parallel to 157, but on the opposite face of cam 102. Shoe 166A of arm 166 is positioned so as to lie in the path of a short locking cam segment 167 on the face of 102. The front end of arm 166 is positioned so that the extending tip of the crossbar angle member 157A can bear down on 166, thus pushing it down when 157A goes down. Hence, as the cam shaft 94 continues rotation, it will rotate cam 102 in a clockwise direction (Figure 12) and thus move the follower 110 from the position of Figure 12 to a lower position. Thus, as follower 110 is elevated or depressed, extension 157B will be elevated or depressed respectively. Extension 157B is attached to rod 161 provided with a clevis 162 at each end, one of which is attached to extension 157B and the other of which is attached to a chain 163. Chain 163 passes around sprocket 164 keyed to drum assembly 80 of retainer R4. The other end of chain 163 is attached to a tension spring 165 secured to the frame member 165A of frame 11. It will be seen that the tension spring 165 thus normally serves to bias the drum assembly 80 for retainer R4 in a clockwise direction with reference to Figure 12, or in a direction whereby it will always tend to engage the surface 18 of the folding table. Consequently, as follower 110 is lowered by action of cam 102, spring 165 will cause the retainer R4 to swing down arcuately into position in engagement with surface 18.

Arm 166 (also pivoted to shaft 98) is engaged by the cam lug 167 as cam 102 rotates. Arm 166 is overlaid by the extending end of member 157A and thus will be depressed at any time that member 157A is lowered. As the follower 110 goes down, member 157A will be elevated and thus arm 166 is free to swing upwardly on shaft 98 under influence of its spring 165 to lower R2 onto the table. To the rearwardly extending end of arm 166, as shown best with reference to Figure 12, is attached a rod 168 by a clevis 169. Clevis 169 attached to a chain 169A and to rod 168 which is passed over a sprocket 164A similar to sprocket 164 and attached to the drum assembly 80 for retainer R2 for rotation therewith. To the other end of chain 169A is attached a tension spring 169B which is affixed to a frame member 169C of frame 11. Therefore, as follower 110 is allowed to go downwardly, the tension on springs 169B and 165 will cause both retainers R2 and R4 to swing downwardly (clockwise in Figure 12) into engagement with the table surface 18.

Attention is now directed to the tail folder and shoulder area holders, shown in Figure 3. In the sequence of operations, the tail folder 30 is next moved from the position of Figure 3 through the position of Figure 17 to the position of Figure 18 to fold up the tail over the extending retainers R1—R5. This is accomplished as follows: As the cam shaft 94 rotates further, cam 100 (which operates the tail folder) displaces follower 108 and pivots tail fold follower arm 170 about shaft 98 against the bias of tension spring 170A attached to angle brace 170B on frame 12, which normally retains arm 170 in the position of Figure 3. The free end of arm 170 is attached to a short rod 171 by a clevis 172 and the other end of rod 171 is attached by clevis 172 to triangular rocker 173, which is pivoted to a hanger 174 secured to the underside of table surface 18.

Also secured to the underside of table surface 18 is a pair of stationary tail folder guide cams 175, which are adapted to engage rollers 176 of the tail folder arms 178 on each side of the table. Tail folder 30, as may be seen with reference to Figures 2 and 3, is essentially an inverted U-shaped frame having depending arms 178 at each side and a bar across the top. The depending arms 178 are pivoted at 178A to rocker arms 180 at each side of the machine, the rear ends of arms 180 being keyed to shaft 179 pivoted in the frame. The rocker plate 173 is also keyed to shaft 179. Hence, as arm 170 is swung arcuately upwardly (Figures 3, 17 and 18), it turns the rocker plate 173 and pivot shaft 179. Since rocker plate 173 is keyed to shaft 179, the latter also rotates and swings arms 180—180, thus lifting side pieces 178—178 of the tail folder frame. Tension springs 181 (one on each side) are connected between the lower ends of arms 178 and arms 180 for normally biasing the tail folder in a clockwise direction with reference to Figure 3. This holds the little roller 176 (on arms 178) against the fixed cam plates 175.

As the arms 170 move from the position of Figure 3 to the position of Figure 17, the rocker plates 173 are pivoted from the position of Figure 3 to the position of Figure 17, the arms 180 and consequently arms 178, by the engagement of roller 176 with guides 175, are forced from the position of Figure 3 to the position of Figure 17. Thus, the movement of the bar of the tail folder frame 178—30—178 from the position of Figure 3 to the position of Figure 17 will be along a swinging arcuate path upward and rearward and downward, thus folding the tail of the shirt upwardly over the ends of the flexible bands 115—119 of retainers R1—R5.

As the tail folder 30 moves from the position of Figure 3 to the position of Figure 17, the hold-down clamps 23 and 24, which engage the front shoulder areas of the shirt, will also be moved from the full line position to the dotted line position of Figure 17 to retain the tail of the shirt after it is folded up. Each of the clamps 23 and 24 is fixedly attached to a pivot bar 187 journaled in under-surface of table top 18. Also fixedly attached to each pivot bar 187 is rocker arm 182 having a tension spring 183 connected to the anchor 12 on the frame. The spring serves to bias the hold-down clamps 23—24 in a clockwise direction, as shown in Figure 17, or in a direction into contact with surface 18.

To the rocker arms 182 of each shoulder and folded tail hold-down clamp, there is attached a pull rod 184 which slides in block 186 whcih is pivoted on pin 186A. The block need not pivot very much, but merely enough to provide a smooth but sensitive guide for the right end (Figures 3, 17 and 18) of rod 184. Also pivoted on pin 186A is a small inverted L-shaped lever 188 having the short end (of the inverted L) pivoted at 186A and the long end depending. This lever carries a cap-screw 189 and locking nut, which are so positioned that the head of the cap-screw will act as a stop for the block 185 which is adjustably held on rod 184 by a set-screw. The stop 185 can thus be engaged by pin 173A on rocker plate 173 to push the stop 185 to the right in Figures 3, 17 and 18, to elevate the clamps 23—24. Also, when the pin 173A releases the stop 185, the stop 185 and rod 184 will be pulled by spring 183 toward the left in Figures 3, 17 and 18 until the stop engages the head of stop screw 189 (which consequently holds clamps 23 in the intermediate position shown in dotted lines in Figure 17). Then when the inverted L lever 188 is moved to the Figure 18 position (by return movement of plate 173 and catch hook 190), the block 185 and rod 184 and consequently the clamps 23—24 are permitted to be pulled to the fully down position. Not all of these positions are shown in the sequence of Figures 3, 17 and 18.

Thus, the rocker plate 173 is provided with a pin 173A which, when the tail folder is in the position of Figure 1, serves to engage the stop 185 to position the clamps 25 and 24 in elevated position. As the tail folder moves from the position of Figure 3 to the position of Figure 17, the pin 173A moves from engagement with stop 185 and the tension spring 183 consequently allows the bar 184 and stop 185 to move to the left (Figures 3, 17 and 18) toward, but not all the way to, clamping position.

Thus, the adjustable cap-screw 189 of stop 188 will be engaged by collar 185 as the tail folder 30 moves to the position of Figure 17 so as to prevent the clamps 23 and 24 from moving all the way down to the shirt clamping position of Figure 17 until the stop 188 is cocked to the position of Figure 18 by engagement with the pivoted pawl 190 positioned on triangular member 173. Pawl 190 will engage the stop 188 and pivot it just as the tail folder 30 commences its return from engagement with the surface 18, or in other words commences the backstroke towards the Figure 3 position.

All of the steel tapes are projected to a uniform position 115A, Figure 1, and collectively the forward ends of the steel tapes provide a "line" about which the shirt tail is folded upwardly. Thus, it will be seen that the tail folder 30 operates to swing the shirt tail upwardly and rearwardly of the machine about the forward ends of the flexible steel tapes of retainers R1—R5. During this movement, which ultimately brings the roller of folder 30 to the Figure 17 position, the clamps 23 are lowered part way to the intermediate dotted line position 23B and this allows folder 30 to pass in and under clamps 23. Then as the folder 30 comes forwardly on the machine and as it just clears the tips of clamps 23, the pawl 90 trips stop 188—189 and the clamps 23 settle on the folded-up shirt tail. Hence, as the folder 30 returns to the Figure 3 position, clamp 23 holds (and its identical companion clamp 24 on the other side, see Figure 2) the shirt tail just as the tail folder commences its return and thus holds the shirt tail in position against the table.

It will be remembered that the cuffs were originally manually laid in a position overlying each other along the center-line of the back of the shirt just below the collar. The up-folded shirt tail covers the cuffs and attached portions of the sleeves.

Further rotation of the cam shaft 94 rotates cam 106 and follower 114, due to the configuration of the cam surface, will return the flexible bands 116 and 118 for retainers R2 and R4 to retracted positions within the drums 80 by operation of tension spring 274, as will be understood from Figures 8 and 11 and the explanation given previously.

At this time, the follower 110 will be displaced by cam 102 to rock arm 157—157A—157B and through the extension 157A to rock arm 166 about shaft 98. This will elevate the retainers R2 and R4 to approximately 45° or more with the steel bands or tapes retracted, but this is only momentarily for while retainers R2 and R4 are thus elevated, the flexible bands 116 and 118 for retainers R2 and R4 will once again be extended by further rotation of cam 106, in preparation for further clamping movement.

After the bands 116 and 118 are extended for retainers R2 and R4, the follower 110 for cam 102 will, due to the cam shape, again be allowed to descend and spring 165 will lower retainer R4 into position for engagement of tape 118 with the surface of folding table 18. At this time, lug 167 will engage the forwardly extending shoe 166A of arm 166 and prevent the steel tape 116 of retainer R2 from similarly moving downwardly into position in contact with the surface 18 even though cam 106 would allow it. Thus, tape 116 of R2 will remain in elevated position at this time until lug 167 clears tip 166A. The tail folder 30 at the same time returns from the position of Figure 18 to the position of Figure 3 and pin 173A will once more engage stop 185 to raise the tail clamps 25 to the position of Figure 3.

At this time the bands 115, 117 and 119 for retainers R1, R3 and R5 retract. Referring particularly to Figures 7, 9 and 10, it is seen that as cam 101 on shaft 94 displaces follower 109 arm 195 rocks about shaft 98 and pulls clevis 196 attached to rod 197, which in turn is attached by clevis 198 to arm 199. Arm 199 being pivoted on shaft 125 is accordingly rocked on shaft 125. An arcuate segmental rack 200, supported by a spacer 201 on frame casting 12, is positioned to engage spur gear 202 which is journaled on arm 199. Gear 202 meshes with and rotates gear 203. Spur gear 203 is attached to a larger spur gear 204 for rotation therewith and is loosely pivoted on shaft 125. Fixedly attached to shaft 77 is a spur gear 207 positioned to mate with gear 204. Inasmuch as the spools 133 of retainers R1, R3 and R5 are fixedly attached to shaft 77, the operation is therefore, that as the follower 109 is displaced radially outwardly by the rising portions of cam 101, this will cause spools 133 to be rotated so as to retract the bands 115, 117 and 119 of retainers R1, R3 and R5 and vice versa.

The next step in the sequence of operation is the folding of the right portion of the shirt over the retainer R4 by the right side folder 28. The explanation of the operation of right fold 28 will be made with reference to Figures 19 and 20. In these figures, the lower portions are shown schematically with the cams 103—105 separated. In the actual device, these cams are side-by-side on shaft 94, as shown in Figure 10.

After the flexible band 118 of retainer R4 (Figure 2) has lowered to the surface 18 in extended position, to hold the shirt (after the tail is folded upward and forward) the right side folder 28 moves from the position of Figure 19 to the position of Figure 20 to fold the side of the shirt over the band 118. Thus, as cam 105 rotates in the direction of the arrow in Figure 19 and reaches the position best shown in Figure 20, it will displace follower 113 of arm 205 pivoted on shaft 98 against the bias of spring 205A, connecting it to frame 12 at angle 205B, and normally serving to retain arm 205 in the position of Figure 19. Arm 205 is provided with a lug 206 having a connecting rod 208 passed therethrough and resiliently positioned relative thereto by compression spring 209 secured in position by threaded stop 210 and nut 211. Rod 208 is thus displaced upwardly with reference to Figures 19 and 20. Rod 208 is connected by a clevis 212 to a pivot 213A on fan-shaped gear segment 213, which is in turn pivoted on rod 214 secured to hangers 215 depending from the underside of surface 18.

The right side folder 28 comprises a pair of hook-shaped arms 220 joined at their outer ends by a connecting rod 221 having extensions upon which are positioned flexible and usually somewhat resilient folding bands 222. The bands 222 are (for clarity) omitted from Figures 19 and 20, but are shown in Figure 2. The bands 222 for the lower extension of right-folder 28 are joined to the lower extension of left side folder 29 as shown best in Figure 2, and the bands 222 for the upper extension of the rod 221 are connected to a rod-like bracket 223 fixed parallel and close to surface 18. Likewise, bands 224 for the upward extension of right side folder 29 are connected to a similar rod-like bracket 225, all as shown in Figure 2. The opposite ends of arms 220 (see Figures 19 and 20) are pivoted about a pivot 226 to which is keyed a spur gear 228 which mates with and is rotated by segmental gear 213. Thus, as the cam 105 moves to the position of Figure 20 from the position of Figure 19, gear 213 rotates gear 228 and the right side folder 28 is accordingly moved to the position of Figure 20 from that of Figure 19, thus folding the side of a shirt over the band 118 of R4, which at this time holds the body of the shirt in contact with the surface 18.

At this time, the arcuate stop 167 on cam 102 moves out from under shoe 166A of arm 166 and retainer R2 is drawn by the action of spring 169B into contact with the shirt on surface 18 and the band 116 of R2 is consequently brought smartly into engagement with the shirt.

The follower 113, shown best in Figures 19 and 20, then drops back into undisplaced position and the right folder 28 returns to the position of Figure 19.

The action of left folder 29 is shown in Figures 20 and 21. The left folder 29 likewise comprises a pair of spaced hook-like arms 216 joined by an extending rod 217 at their outer end and similar to folder 28. The inner ends of arms 216 are attached to pivot shaft 219 to which is keyed spur gear 218. Gear 218 meshes with the fan-shaped segmental gear 229 pivoted at 230 on the frame. To the crank pivot 229A on gear 229, there is attached clevis 231 of connecting rod 232, which is resiliently lifted by compression spring 233 bearing on threaded stop 234 and nut 235. The lower end of spring 233 bears on lug 236 of arm 238 which pivots about shaft 98. Arm 238 swings on shaft 98, mounted on the machine frame, and carries cam follower 111, which bears on cam 103 on shaft 94. Spring 238A biases arm 238 downwardly. Thus, as follower 111 is displaced, the left folder 29 moves from the position of Figure 20 to that of Figure 21.

Movement of left folder 29 thus folds the left side of the shirt over the flexible retaining band 116 of R2 and also over the right side of the shirt.

Simultaneous with the movement of left folder 29, a left paper band folder moves from the position of Figure 20 to the position of Figure 21. The folder 27, as a whole, comprises a flat plate 240 pivoted at 241 to a pair of arms 242 which are positioned in spaced relation on shaft 219. A rod 237 extends between the two arms 216 which comprise the left folder 29. A tension spring 243 has one end connected to this rod 237 and the other end connected to one of the arms 242, and as the arms 216 of left side folder 29 move arcuately they serve also resiliently to swing the band folder 27 arcuately with the side folder 29. An angle stop 244 on arms 242 engages the rod 237 on the left folder 29 and prevents the paper band folder arms 242 from running ahead and also serve to return the arms 242 from the position of Figure 21 to that of Figure 20.

After the paper band folder 27 has assumed the position of Figure 21, it dwells in that position.

The right portion of the paper band folder is at 26 and is operated by an independent cam and connecting mechanism similar to that for the operation of right and left shirt folders 28 and 29, which are shown in Figures 19–22. This right band folder 26 is operated by cam 104 on shaft 94. Cam 104 moves cam follower 112 on arm 250, the latter being pivoted on shaft 98. A resilient push connection 251, identical with those explained before with reference to cams 103 and 105, connects arm 250 to rod 252 which has a clevis 253 connection to pivot 254A on fan-shaped segmental gear 254, which is also pivoted on shaft 214, and positioned side-by-side (in back of) segmental gear 213. Arm 250 is also provided with a return bias spring 250A connected to angle brace 205B. Spur gear 255 meshes with gear 254 and is keyed to a sleeve 255A journaled on shaft 226. On sleeve 255A are arms 256 having a pivot at 257, to which the flat plate 240A of right paper band folder 26 is pivotally attached.

The paper band folding mechanism thus includes the two plates, viz: plate 240A pivoted at 257 on swinging arm 256 and plate 240 pivoted at 241 on swinging arm 242. These plates have the configuration shown in Figure 2 and each has a slit inward from each side and parallel to its pivot axis, thus providing prongs on which the ends of bands 26A and 27A may be anchored. The bands 26A and 27A have headings in each end which are thus easily slipped onto these prongs and the bands are slightly resilient and thus by slight tension hold the plates 26 and 27 flat when they are in the position of Figures 2 and 19. The bands 26A and 27A are not shown in Figures 19–22, but it will be understood that they are thin, resilient and stretch across the intervening portion of table 18 between plates 26 and 27. The bands 26A and 27A are not so strongly resilient as to crush the shirt when the carriers 26 and 27 are swung to the Figure 22 position, but merely lightly embrace the shirt.

Now the paper binders, which are to embrace the finished folded shirt, have tacky surfaces as aforesaid and are stacked in well 19 so as to be readily available to the operator. The operator puts the paper band down first along line P—P of Figure 2 and then makes the shirt lay. The folding operations ensue as aforesaid and the paper band carriers then come up and bring the band into place. It is then that the gentle pressure is applied to the overlapping ends of the paper band by the following mechanism:

On the sleeve 255A there is journaled a presser arm 261 having a soft and somewhat heavy head 260 which applies the pressure to the overlapped ends of the paper band. Arm 261 is hauled around arcuately by a cross-piece between the parallel arms 256 of the right paper band folder. A spring 259, which attaches between head 260 and cross-piece 258, holds arm 261 back against the cross-piece 258 and insures return swinging movement of arm 261 while allowing some drag on the return. Thus, as arms 256 swing up, the head 260 is brought smartly down on the overlapped ends of the paper band and insures adherence between the cooperating adhesively coated ends which face each other when the band is folded around.

The cams 103 and 104 then operate to permit return to undisplaced position of followers 111 and 112 and the left folder 29, right folder 28 and right and left 26 and 27 return to initial position, that is, Figure 19.

At this time, as shown in Figure 4, the lug 263 on cam 104 engages the surface of an arm 264 pivoted to the frame 11 at 265. Arm 264 is beneath shaft 94 and as the cam 104 reaches the position of Figure 4, arm 264 is pushed downwardly. Arm 264 is provided with a bifurcated end 266 which embraces rod 39. Rod 39 has a stop 267, which is engaged by end 266 of arm 264, as shown in Figures 4 and 6, thus moving the rod 39 downward. Rod 39 is attached to crank arm 41, which accordingly actuates to contract the collar mold 21, so that the collar of the now folded and banded shirt may be lifted therefrom.

Through the operation of the appropriate cams, retainers R2 and R4 are then rotated 180° rearwardly of the machine and since the folded and banded shirt is folded around the steel tapes 116 and 118 of R2 and R4, respectively, the folded and banded shirt is swung upward over to the rear of the table by the displacement of follower 110 by cam 102. In this position, the flexible bands 116 and 118 for retainers R2 and R4 are smartly retracted by the action of the spring 274, which is permitted to operate by the shape of the cam 106, which is seen best with reference to Figure 21. As bands 116 and 118 retract, the shirt will engage the end surfaces 270 positioned on the ends of the channel guides 156 of retainers R2 and R4 and will consequently be freed from the retracting bands 116 and 118. The folded and banded shirt then simply drops into a basket placed behind the machine.

At this time, retainers R1, R3 and R5 are (through the appropriate cams) elevated to a position of approximately 60° with reference to the surface 18. With the retracton of the bands 115, 117 and 119 for retainers R1, R3 and R5, as previously explained with reference to Figure 7, the stops 146 of spools 133 for retainers R1 and R5 have engaged the stops 139 for drums 137 of the same retainers. Further rotation of cam 101 now further rotates spools 137 through the follower 109, follower arm 195 and connecting linkage as shown in Figure 7, and the engagement of stops 139 and 146 thus rotates the housings 80 for retainers R1 and R5 to the 60° elevated position of Figure 6. Rotation of these two housings through connections 79 and 78 rotates shaft 76, thus rotating lever 68 until it engages the latch member 66 and is maintained in the position of Figure 6. Rotation of lever 68 likewise rotates lever 86, sleeve 85, rocker arm 84 and connecting rod 88 to rotate the housing 80 of retainer R3 to the position of Figure 6. Retainers R1, R3 and R5 are maintained in this position by the engagement of levers 68 and latch 66.

Further rotation of cam 102 then allows the retainers R2 and R4 to rotate to the normal 60° position of Figure 12.

The machine has then completed a cycle and an automatic cam actuated switch stops the rotation, thus halting the machine in the initial position, ready for another cycle.

In Figure 30, there is shown a straight line diagram of the electrical wiring for the motor drive, lights, heater and controls therefor. The table top 18 is perforated at several places with small holes, and in addition openings are provided through which the various folding elements extend. One or more lights 300 are mounted below the table top and the light shining up helps illuminate the shirt and thus assists the operator in getting out any wrinkles on the shirt front, which is lowermost when initially placed on the machine preparatory to the folding operation. The lights 300 also illuminate the mechanisms for servicing.

In addition, the collar island mold 21 is provided with a heater for drying out any residual moisture that may remain in the collar. This heater, which is at 301, is mounted centrally within collar island mold 21.

The circuits include power lines L1 and L2, which are fused at 303 and connected through an On-Off control switch 304 to supply busses 305 and 306. Lights 300 and heater 301 are connected directly across busses 305—306 and hence are energized whenever the switches 304—304 are closed and vice versa. With switches 304—304 closed, a circuit extends from junction 307 (on buss 305) through junction 308 and thence through a normally open "starting" switch 310 and line 311, junction 312, thence through coil 313A of relay 313 to junction 315 on buss 306. The circuit thus established energizes relay 313 and closes its three, normally open, contacts 313B, 313C and 313D. The holding circuit for relay 313 is from junction 308, thence through line 316, through a normally closed push button "Emergency Stop" switch 317, and through normally closed cam actuated microswitch 318. The holding circuit continues through contact 313B of relay 313 and to junction 312, whence the circuit is coupled through coil 313A to buss 306. Hence, the relay 313 remains energized until either the "Emergency Stop" push button switch 317 or the cam actuated micro-switch 318 are opened, the latter being opened automatically at the zero or stop position, one time for each turn of shaft 94. The contacts 313C and 313D control motor 89. Thus, a circuit extends from junction 320 on buss 305, through contact 313D, motor 89, contact 313C to buss 306. Hence, motor 89 drives through clutch and gear unit 92 to rotate sprocket 91 and through chain 90 and sprocket 93 to turn shaft 94. On the side of one of the cams on shaft 94, there is mounted a little clip 321, so located as to engage roller 322 of micro-switch 318. When the cam and shaft 94 come to the completion of one turn (for one cycle of folding movements), the micro-switch 318 is opened, relay 313 is de-energized and its contacts opened and motor 89, and hence all mechanisms driven by it come to stop. If desired, the motor may be of the type having a brake which is applied when the motor is de-energized and vice versa, so as to insure a quick and positive stop without drifting, although this is not essential, as some variation in the exact stopping position can be tolerated.

In Figure 29, there is shown a chart, depicting the developed plan of the several cams 100–106, by which the various motions of the folding sequence are obtained. In this figure the cams 100 to 106 are shown positioned in succession, one above the other, each opposite the corresponding numbered bracket at the left. The two fine parallel lines at the base of the figure and under each cam is a datum position for the cam above it, and represents a certain radial dimension on the cam, which is lower than the lowest spot on the cam. The "Start" position is shown at the left side of Figure 29 and operation proceeds to "Stop" position at the right side of the figure. The "stop" position is the "start" of the next cycle. The base line represents one full turn of the cams (and shaft 94), that is, 360°, and for convenience it is divided into fifteen positions numbered 0 to 15. Space between successive divisions represents 24° each of cam movement. The chart, Figure 29, depicts the automatic operations which follow the initial manual operations in the folding sequence. Briefly, the operation, including the manual and automatic functions, proceeds as follows:

*Manual Operations*

In the start position, all of the steel tapes 116–119 of retainers R1 to R5, respectively, are elevated at an angle of about 60° with respect to the table top. Tapes 115 (of R1), 117 (of R3) and 119 (of R5) are extended; tapes 116 (of R2) and 118 (of R4) are retracted. The operator places a paper band in position along line P—P (Figure 2) and then places the ironed and buttoned shirt front downwardly with the collar downwardly around island 21, the right and left sleeves draped outwardly and downwardly over the right and left sides respectively of the table and the shirt tail towards the front over the bar of tail folder 30 and the balance of the tail draped down over the front curved edge of the table. The operator then depresses the foot treadle 33 which unlatches 66—68 (Figure 4) preparatory to further action, and then as the treadle is released, the collar island mold 21 is expanded by spring 65 (Figure 4) to mold and shape the collar (with heat) and to permit the housings 80 of R1 and R5 to lower. The operator then places a rectangular piece of cardboard, about 8" x 14" (or other appropriate dimensions depending on the size of the shirt), with its long dimension under tape 117 and its upper edge about even with the upper edge of collar mold 21. The operator then folds the sleeves inwardly, the left sleeve being brought in over tape 115 of R1 until the flat cuff will lie over the cardboard under the still elevated tape 117 of R3. The right sleeve is likewise folded with the cuff brought under 117. The treadle is then fully released and this allows tape 117 of R3 to swing down and this holds the cuffs against the cardboard.

*Automatic Operations*

With the sleeves thus folded in and the tail properly straightened and aligned over the bar of tail folder 30, the manual operations are complete and it is only necessary to push the "Start" button 310 (Figure 30) and automatic operations ensue, which end with the discharge of the folded and banded shirt into a basket placed at the rear of the machine. In the following explanation, the reference characters on the sequence chart, Figure 29, for the most part, refer to the beginning of some operation or change in operation.

From the "Start" position, the rotation of the cams proceeds and at 350 cam 106 begins to extend the steel tapes 116 of R2 and 118 of R4, the drums 80—80 of R2 and R4 being still elevated by portion 351 of cam 102. At 352, cam 102 begins to lower the tapes 116 and 118 toward the table surface and the slope of cam 106 is changed at 353 to accommodate the rate at which the tapes 116 and 118 are extended to the rate of rotation of the R2 and R4 housings, since their motions are relative. The lowering of tapes 116 of R2 and 118 of R4 is complete at 354. Meanwhile, the tail folder cam 100 has initiated movement of the tail folder mechanism, and upon completion of this movement the tail fold mechanism begins its retraction at 355. Substantially simultaneously with the completion of the tail fold at 356, cam 106 begins at 357 to retract the band 116 of R2 and 118 of R4. When the bands 116 of R2 and 118 of R4 are partially retracted, cam 102 at 358 begins to rotate their drums to elevate the bands to a 30° angle with respect to the table and the slope of cam 106 is changed at 359 to accommodate the retracting motion to the housing rotation since these are relative. While cam 102 is still elevating the retainers of R2 and R4 at 360, cam 106 at 361 begins again to extend the steel tapes 116 of R2 and 118 of R4, this motion being continued after the housings are fully raised at 362.

At 363 cam 102 allows R4 and its band 118 to swing down against the table 18, the slope of cam 106 being simultaneously changed at 364 to accommodate this, since the movements of R4 and 118 are relative. It will be remembered that boss 167 on cam 102 (Figures 10, 12 and 23) is still effective to maintain R2 and steel tape 116 in an elevated position even though tape 118 is lowered.

Meanwhile, the tail folder cam 100 has been returning the tail folder 30 and associated mechanisms from the forward position at 356 toward the retracted position at 365. Closely following position 356 at the high point on cam 100, pawl 190 unlatches stop 188—189 (Figures 17–18) and has allowed rod 184 to lower the tail clamps 23 and 24 to the lowered position where they hold the tail of the shirt. Thence continuing, the cam 100 further retracts the tail folder to an intermediate position 365, which is just short of where pin 173A engages stop 185 in rod 184. This dwell period 365—366 is maintained while ensuing operations 363 and 364 aforementioned are taking place, and then at 366 cam 100 begins again to retract the tail folder 30 and with this motion pin 173A engages 185 and lifts the tail holders 23 and 24 (Figure 3), this being completed at 367. The reason for lifting the clamps 23 and 24 at this time is because in their lowered position clamps 23 and 24 are in line with portions of the right and left side folders (see dotted line positions of 23 and 24, Figure 2) and since the side folding operations are about to begin, tail clamps 23 and 24 must be retracted.

Likewise the steel tapes 115 of R1 and 119 of R5 would interfere with side folding, and hence as clamps 23—24 are being raised via cam 100 (366—367), cam 101 at 368 begins the retraction of tapes 115 of R1, 117 of R3 and 119 of R5, this being completed at 369.

The side folding operations now promptly begin. Thus at 370 cam 105 brings right side folder 26 in to swing those portions of the shirt inwardly, the fold being made around steel tape 118 of R4 which has already lowered. The free margin of the thus folded shirt swings to a position approximately under steel tape 116 of R2, which is meanwhile still elevated, but once the right side fold has been completed by cam 105, boss 167 on cam 102 allows R2 and tape 116 to swing down and hold the thus folded right side of the shirt. Then at 372, cam 105 begins to retract the right side folder 26, this being completed at 377.

Meanwhile, once the tape 116 of R2 has been lowered, the left side folder cam 103 begins at 373 to swing the left side of the shirt inwardly to fold it around the tape 116 which is now down on the shirt. This action brings with it one end of the paper band. The left side folder 373 completes its fold at 374 and begins a dwell which does not terminate until 375. The left side folder holds the shirt and the end of the paper band that has been brought up around the shirt by the folder 27 and left ends of bands 26A and 27A. Note that plate 240 is notched at 240B to expose the paper band for adhesion, later on to the other end of the band.

As left side fold is completed at 374, the sealing mechanism cam 104 operates the sealer head 260 and its carrying arm 261 (Figures 19–22), through a cycle, beginning at 375A. The stroke is complete and head 260 applies pressure against the overlying ends of bands to seal them. Note that plate 26 of the right sealer has an end tab 26B which fits through the notch 240B when the two are swung together and the sealer head 260 applies pressure to the overlying ends of the paper band by pressure being applied to the back of tab 26B which is thereby pushed down against the paper ends. The sealer cam dwells to 378 before it begins its retraction to 379. Meanwhile the side cam 263 on the sealer cam has reached a position (Figure 4) where it retracts the collar island mold 21.

Cam 101 much earlier had begun retraction of steel tapes 115 of R1, 117 of R3 and 119 of R5, the retraction being completed at 369, but the drums 80 of R1, R3 and R5 were still left in a position such that if their steel bands had been extended they would be at table level. As lobe 263 on cam 104 began its operation to contract the collar mold 21 (Figure 4), lever 264 through rod 39 also operated bellcrank 36 to move the R1, R3 and R5 housings to the 60° raised position (Figure 6) and hence cam 101 at 380 began a further retracting movement of bands 115, 117 and 119, completed at 381, since the bands move relative to their housings. The motion of the steel bands is made slightly in advance of the movement of the housings via cam lobe 263 of cam 104. Cam lobe 263 moves lever 68 high enough to latch up on latch 66. The retracting motion of cam 101 begins at 383 and continues to the stop position.

The folded and banded shirt, still in position on table 18 with the tapes 116 of R2 and 118 of R4 inserted thereon, is then ready to elevate and dump. This is accomplished by a combination of motions of cam 102 which controls the position of shirt retainer drums of R2 and R4 and cam 106 which controls the degree of extension of tapes 116 of R2 and 118 of R4. The motions are relative.

Beginning at 390, cam 102 moves to swing drums 80 of R2 and R4 at a uniform rate through about two-thirds of a revolution upwards and backwards and towards a downwardly extending dumping position. As this motion of the drums 80—80 of R2 and R4 begins, the tapes 116 and 118 of their housings are extended with the shirt folded around them. The tapes must remain extended and since a backward swinging motion would, in effect, further extend the tapes, cam 106 at 391 rotates the spools within R2 and R4 just sufficiently to keep the tapes 116 and 118 in substantially the same extended position as they had at their position parallel to the table 18. Hence, when cam at position 392 has achieved the dumping position for shirt retainer drums R2 and R4, the tapes 116 and 118 are still extended at the corresponding position 393 of cam 106. Then as cam 102 dwells from 392 to 394, cam 106 at 393 allows tapes 116 and 118 to be smartly retracted and the folded and banded shirt drops off into an awaiting receptacle. Then from 394 on cam 102 and 395 on cam 106, the motions are such as to bring R2 and R4 to the starting position, that is, shirt retain drums elevated to 60° above the table with the steel bands 116 and 118 retracted.

In an exemplary operation, the automatic portions of the sequence can be accomplished in ten to twelve seconds. One proficient operator can "fold" 180 shirts per hour using the present invention.

As many widely differing embodiments of this invention may be made without departing from the spirit and scope thereof, it is to be understood that we do not limit ourselves specifically to the embodiments disclosed herein.

What we claim is:

1. In combination a machine frame having thereon a work surface, a retaining means mounted on the frame for retaining an article on said surface, folding means mounted on the frame for folding said article about said retaining means, said retaining means including a plurality of flexible members, a housing for each of said flexible members, a spool attached to one end of each of said flexible members and means on the frame connected to each of the spools for rotating each of said spools for retracting its flexible member within its housing.

2. The apparatus of claim 1 further characterized in that each housing includes a guide means pivotable from an elevated to a depressed position, said guide means being secured to said housing and said spool means rotatable within said housing.

3. The apparatus of claim 1 further characterized in that at least one housing includes a limit stop and said spool means includes a limit stop mounted to engage the limit stop of said housing for moving the housing.

4. In combination, a machine frame having thereon a work surface, a plurality of rotatable and retractable retaining means mounted on the frame for retaining an article on said surface, folding means mounted on the frame for folding said article about said retaining means, said retaining means comprising a first flexible band means and a second flexible band means, said first and second flexible band means being normally positioned in elevated relation to said surface and movable into engagement therewith, means for simultaneously moving the first and second means into an elevated position and operator actuable release means for returning the first and second means to an article engaging position in sequence, the operator actuable release means including a single operator actuated member.

5. In a machine for folding articles comprising in combination a machine frame having a work surface thereon, first and second means mounted on the frame for retaining an article on said surface, sequentially operable right and left side folder means mounted on the frame for folding said article about said retaining means and relative cam and follower means for operating said retaining means and said folding means, said first and second retaining means being movable from an index position to article engaging position, the improvement comprising an operator release member, and means connecting the release member to the first and second retaining means for returning the first retaining means to an article engaging position and holding the second retaining means in an index position until the first retaining member returns to an article engaging position and then operably releasing the second retaining means.

6. A shirt folding mechanism comprising in combination a machine frame having a work surface thereon a first and second retaining means mounted on the frame, means mounted on the frame for folding a shirt about said retaining means, said first retaining means comprising two spaced extensible members and a housing for each of the spaced extensible members, said second retaining means comprising an intermediate extensible member, a housing for said intermediate extensible member, means connecting the housings of said first and second retaining means for providing simultaneous arcuate movement of the housings to elevated position and means connected to the housing of said intermediate member for preventing movement of said intermediate housing to shirt engaging position until said housings for said spaced members have moved to shirt engaging position.

7. The apparatus of claim 6 further characterized by an expansible collar mold positioned on said surface and in normally expanded position, means for elevating and depressing said housings, means connected to said collar mold for simultaneously contracting said collar mold as said housings are elevated and for releasing said collar mold to expanded position as the housings are depressed.

8. A shirt folding mechanism comprising in combination a machine frame having thereon a work surface, retaining means mounted on the frame for retaining a shirt on said surface, folding means mounted on the frame for folding said shirt about said retaining means and means for operating said retaining means and said folding means, said retaining means including three spaced retaining members and a collar mold for receiving the collar of the shirt thereon, said retaining members being elevated from said surface when in index position and said collar mold being expanded when in said index position, an operator actuable means mounted on the frame and connected to the collar mold and retaining members for contracting said collar mold while retaining said retaining members in index position as said operator actuable means is moved from a first to second position, said operator actuable means when released from second to first position operating to expand said collar mold and to release said retaining members to shirt engaging position.

9. The apparatus of claim 8 further characterized in that said retaining members comprise two spaced retaining members and an intermediate retaining member and means whereby said spaced retaining members will move to shirt engaging position before said intermediate retaining member.

10. A shirt folding mechanism comprising in combination a machine frame having thereon a work surface, retaining means on the frame for retaining the shirt on said surface, folding means for folding said shirt about said retaining means and means for operating said retaining means and said folding means, said retaining means including three spaced retaining members and a collar mold for receiving the collar of the shirt thereon, said retaining members being elevated from said surface when in index position and said collar mold being expanded when said index is in position, a shaft mounted on the frame, a drum housing loosely pivoted to the shaft for each of said retaining members, means interconnecting the drum housings, and operator actuable means mounted on the frame for contracting said collar mold while retaining said retaining members in index position as said operator actuable means is moved from a first to second position, said operator actuable means when released from second to first positions operating to expand said collar mold and to release said retaining members to a shirt engaging position.

11. The apparatus of claim 10 further characterized by means for biasing said drum housings to index position.

12. A machine for folding shirts comprising in combination a machine frame having a retaining surface, means on the frame for retaining a shirt on said surface, folding means mounted on the frame for folding the shirt about said retaining means, means supported on the frame for operating said folding means and said retaining means a shaft mounted on the frame, said retaining means including a plurality of flexible members, a plurality of drum housings positioned upon the shaft for rotation and into which said flexible members are retractable, first means on the frame for extending and retracting some of said flexible members in unison and second means on the frame for extending and retracting others of said flexible means in unison.

13. The apparatus of claim 12 further characterized in that each of said flexible members has one end attached to a spool situated within each housing, some of said spools being loosely pivoted on said shaft, means for rotating said spools in unison, and others of said spools being fixedly attached to said shaft for rotation in unison therewith.

14. A machine for folding articles comprising in combination a machine frame having thereon a work surface, means mounted on the frame for retaining an article on said surface, folding means mounted on the frame for folding said article about said retaining means and relatively cooperative cam and cam follower means supported on the frame for operating said retaining means and said folding means, said retaining means including a first retaining means and a second retaining means, said first and second retaining means being normally retained in elevated position relative said surface, control linkage for said first and second elevating means attached to a yoke and an actuator lever attached asymmetrically to said yoke for releasing said first and second retaining means from elevated to surface engaging position whereby said first retaining means will engage said surface prior to the engagement of said second retaining means.

15. In a shirt folding machine comprising in combination a machine frame having thereon a work surface, means on the frame for retaining an article on said surface, means mounted on the frame for folding said article on said surface and means supported on the frame for operating said retaining and folding means, the improvement comprising a plurality of extendible and contractible members each having one end attached to a retractor, a housing enclosing said retractor, a common shaft mounted on the frame, said housings and said retractors being positioned upon the common shaft, each of said housings being loosely positioned upon said shaft and some of said retractors being fixedly positioned and some of said retractors being loosely positioned on said shaft.

16. In a machine for folding articles, comprising in combination a machine frame having thereon a work surface, means mounted on the frame for retaining an article on said surface, folding means mounted on the frame for folding said article about said retaining means and means supported on the frame for operating said retaining means and said folding means, the improvement comprising an extensible and contractable member having one end secured to a spool retractor, said spool retractor being enclosed within a housing and cooperating stop means on said housing and said spool retractor for determining a limit position of said extensible and contractable means with respect to said housing.

17. The apparatus of claim 16 further characterized in that said housing includes a guide means for guiding the extension and contraction of said extensible and contractable means.

18. In a machine for folding articles comprising in combination a machine frame having a work surface, means mounted on the frame for retaining an article on said surface, folding means mounted on the frame for folding said article about said retaining means and means for operating said retaining means and said folding means, the improvement comprising a first shaft mounted on the frame, gear means attached to said first shaft, a rotary retainer comprising a housing and an extensible means positioned in said housing, said housing of said extensible means being loosely positioned upon the first shaft, a second shaft mounted on the frame, cam mechanism on the frame, gear means positioned upon the second shaft and operated by said cam mechanism for extending and contracting said extensible means.

19. In a machine for folding articles comprising in combination a machine frame having thereon a work surface, means on the frame for retaining an article on said surface, folding means mounted on the frame for folding said article about said retaining means and means on the frame for operating said retaining means and said folding means, the improvement comprising a shaft mounted on the frame, a housing having an extended arm and loosely positioned upon the shaft and having a stop therein, a rotary member rotatable relative said housing and likewise loosely positioned on said shaft, an extensible member having one end positioned on said rotary member for extension thereby, said rotary member also including a stop adapted to engage the stop on said housing in contracted limit position whereby further rotation of said rotary member will rotate said housing for elevating said extending arm.

20. The apparatus of claim 19 further characterized by gear means affixed to said rotary member a second shaft mounted on the frame and gear means disposed upon a second shaft, and a cam operated mechanism mounted on the frame for operating said gear means on said second shaft for rotating said rotary member.

21. In a machine for folding articles comprising in combination a machine frame having thereon a work surface, rotatively retractible means mounted on the frame for retaining an article on said surface, folding means mounted on the surface for folding said article about said retaining means and means for operating said retaining and folding means, the improvement comprising first and second retaining members on the frame movable from elevated to surface engaging position, mechanism supported from the frame for moving said first and second members from elevated to surface engaging position including cam operating mechanism mechanically connected to said first and second members for simultaneously elevating said members and cam operating mechanism supported on the frame for sequent depression of said first and second members.

22. In a machine for folding shirts, comprising in combination a machine having a work surface, retractible and expansible means mounted on the frame for retaining a shirt on said surface, folding means mounted on the frame for folding said article about said retaining means and means mounted on the frame for operating said retaining means and said folding means, the improvement comprising a mechanism connected to the frame for folding the tail of said shirt about said retaining means comprising a cam operated mechanical linkage including a folding member supported by a pair of uprights and means normally biasing said uprights against a downwardly turned cam track.

23. In a machine for folding shirts comprising in combination a machine frame having thereon a work surface, means mounted on the frame for retaining a shirt on said surface, folding means mounted on the frame for folding said shirt about said retaining means, and said folding means, the improvement comprising a first mechanical side folding means mounted on the frame adapted for folding one side of a shirt, second mechanical side folding means mounted on the frame adapted for folding the second side of a shirt over the first folded side of the shirt and for simultaneously folding a paper band around said shirt, and third folding means mounted on the frame for folding the other end of said paper band around said shirt and into overlapping relation with the other end of said paper and means for applying pressure to the overlapped ends of the paper band.

24. The apparatus of claim 23 further characterized by said third folding means including a member for applying pressure to one end of said folded paper band.

25. In a mechanism for folding articles including in combination a machine frame having a work surface, means mounted on the frame for retaining and folding an article on said surface, the improvement comprising an extended flexible member on the frame, and means mounted on the frame for coiling said member for the retraction thereof.

26. The apparatus of claim 25 further characterized by said retraction means comprising a drum housing and a rotary member rotatable relative one another.

27. The apparatus of claim 26 further characterized in that said retraction means includes a shaft mounted on the frame and said rotary member and said housing are loosely positioned on the shaft for rotation on said shaft.

28. The apparatus of claim 26 further characterized in that said retractor means includes a shaft mounted on the frame and said rotary member is affixed to a shaft and said housing is loosely positioned thereon.

29. The apparatus of claim 26 further characterized by first means for rotating said drum housing and second means for rotating said rotary member.

30. In a shirt folding mechanism, a machine frame having thereon folding surface, means mounted on the frame for retaining a shirt thereon with the tail of the shirt draped loosely over one end of said surface, means mounted on the frame surface for clamping the collar of said shirt, shoulder clamp means mounted on the frame to be positioned on the surface for engaging the shoulder areas of said shirt, tail folder means on the frame for swinging the draped tail of the shirt over the body of said shirt, and rotary cam means on the frame for sequentially elevating said shoulder clamp means and for swinging the tailfolder across said surface to bring the tail of the shirt under said shoulder clamp means, and for then lowering said shoulder clamp means onto the thus folded tail of the shirt as said tail folder means swings away from a position under said shoulder clamp means.

31. In a shirt folding mechanism including a folding table, the improvement comprising a drum housing mounted on said table for arcuate swinging movement about an axis parallel to said table, said drum housing being provided with a tangential guide protrusion, a spool mounted coaxially with the drum, a flexible member coiled on said spool, and attached thereto and having one end extending through said tangential guide protrusion and means for moving the drum housing arcuately in timed relation as said spool is rotated relative to the drum.

32. The apparatus of claim 31 further characterized in that guide rollers are provided within the drum around the periphery of said spool for guiding said flexible member.

33. The apparatus of claim 31 further characterized in that said drum has a housing gear thereon for rotating it, and segmental rock gear means for rotating said housing gear.

34. The apparatus of claim 33 further characterized in that cam means is provided for actuating said segmental rock gear means.

35. The apparatus of claim 31 further characterized in that said spool is rotated with reference to the drum housing by means of a segmental rock gear means.

36. In a shirt folding mechanism having a machine frame including a folding surface thereon and means mounted on the frame for retaining a shirt on said surface, the improvement comprising a plurality of drum housings mounted on the frame so as to be positioned on said surface for arcuate movement about an axis parallel to said surface, each of said drum housings including a tangential protuberance from which a flexible shirt engaging member is adapted to be extended, said drum housings being mounted with reference to the surface so that said flexible members will be parallel to and in engagement with the surface with the drum housings rotated to one position and angularly elevated with reference to said surface when the drum housings are arcuately rotated to another position, and mechanical means on the frame for rotating said housing arcuately in timed relation.

37. The apparatus of claim 36 further characterized in that said mechanical means includes a cam device and linkages connecting said cam device to said housings for simultaneously elevating said housings and for sequentially lowering them.

38. In combination a machine frame having a work surface, retaining means mounted on the frame for retaining an article on said surface, folding means mounted on the frame for folding said article about said retaining means mounted on the frame, said retaining means including a plurality of elongated members, a housing for some of said elongated members, a rotary means connected to each of said elongated members and means on the frame connected to each of the rotary means for rotating each of said rotary means for retracting its elongated members within its housing.

39. The apparatus of claim 38 further characterized in that each of said housings includes a guide means mounted on the housing pivotable from an elevated to a depressed position.

40. The apparatus of claim 38 further characterized in that at least one housing has mounted thereon a limit stop and said rotary means includes a limit stop mounted to engage the limit stop of said housing for moving the housing.

41. A shirt folding mechanism comprising in combination a machine frame having a work surface, retaining means mounted on the frame for retaining a shirt on said surface, folding means mounted on the frame for folding said shirt about said retaining means and means mounted on the frame for operating said retaining means and said folding means, said retaining means including three spaced retaining members and a collar mold for receiving the collar of the shirt thereon, said retaining members being elevated from said surface when in index position and said collar mold being expanded when in said index position, an operator actuable means on the frame for contracting said collar mold while retaining said retaining members in index position as said operator actuable means is moved from a first to second position, said operator actuable means when released from second to first position operating to expand said collar mold.

42. The apparatus of claim 41 further characterized in that said retaining members comprised two spaced retaining members and an intermediate retaining member and means whereby said spaced retaining members may be moved to shirt engaging position before said intermediate retaining member.

43. In a shirt folding machine comprising in combination a machine frame having a work surface, means on the frame for retaining an article on said surface, means mounted on the frame for folding said article on said surface and means mounted on the frame for operating said retaining and folding means, the improvement comprising a shaft mounted on the frame, a plurality of retractors, a plurality of extendable and contractable members each having one end attached to a retractor, and housings for enclosing said retractors, said housings for enclosing said retractors, said housings and said retractors being mounted on the shaft.

44. In a machine for folding articles, comprising in combination a machine frame having thereon a work surface, means mounted on the frame for retaining an article on said surface, folding means mounted on the frame for folding said article about said retaining means and means on the frame for operating said retaining means and said folding means, the improvement comprising an extensible and contractable member having one end connected to a rotary retractor and cooperating stop means on said housing and said retractor for determining a limit position of said extensible and contractable means with respect to said housing.

45. In a machine for folding articles comprising in combination a machine frame having thereon a work surface, means mounted on the frame for retaining an article on said surface, folding means mounted on the frame for folding said article about said retaining means and means mounted on the frame for operating said retaining means and said folding means, the improvement comprising a retainer comprising a housing and an extensible means positioned therein, a first shaft mounted on the frame, said housing of said extensible means being positioned on said first shaft, a second shaft mounted on the frame, gear means positioned upon said first and second shaft, and cam mechanism operating said gear means for extending and contracting said extensible means.

46. In a machine for folding articles comprising in combination a machine frame having a work surface, means mounted on the frame for retaining an article on said surface, folding means mounted on the frame for folding said article about said retaining means and means on the frame for operating said retaining means and said folding means, the improvement comprising a shaft mounted on the frame, a housing having an extended arm and positioned upon a shaft and having a stop therein, a rotary member rotatable relative said housing and likewise positioned on said shaft, an extensible member positioned in said housing, said rotary member also including a stop adapted to engage the stop on said housing in limit position whereby further rotation of said rotary member will rotate said housing for elevating said extending arm.

47. In a machine for folding articles comprising in combination a machine frame having thereon a work surface, rotatively retractible means mounted on the frame for retaining an article on said surface, folding means mounted on the frame for folding said article about said retaining means and means on the frame for operating said retaining and folding means, the improvement comprising first and second retaining members mounted on the frame for movement from elevated to surface engaging position, mechanism mounted on the frame for moving said first and second members from surface engaging position including cam operated mechanism having a plurality of cams, cam followers, and mechanical linkages mechanically connecting the cam followers to the retaining members for simultaneously elevating said members and sequentially releasing said first and second retaining members for rotation to a surface engaging position.

48. In combination, a machine frame having a work surface thereon, a plurality of relatively aligned rotatable retaining means sequentially operable mounted on said frame in side by side relationship for retaining an article on said surface, means mounted on said frame for folding said article about said retaining means, and a plurality of first and second rotatable cam and cam follower means mechanically connected to the retaining means and said folding means for sequentially operating said retaining means and said folding means, and means connected to the frame for mounting said first and second cam and cam follower means.

49. The apparatus of claim 48 further characterized by mechanical means connecting the cam follower means to the retaining means for operating said retaining means to deliver said article from said surface after the article is folded, the cam follower means being actuated in sequence by said cam means for operating the retaining means to deliver said article.

50. In combination, a machine frame having a work surface, means mounted on the frame for retaining an article on said surface, folding means mounted on the frame for folding said article about said retaining means, said retaining means including at least one extensible member, a drum housing into which said member is retractable, means connected to the extensible member for retracting said member into the housing and means mounted on the frame for supporting the drum housing and operatively mounting the retracting means.

51. A machine for folding articles comprising in combination a machine frame having a work surface, means on the frame for retaining an article on said surface including a plurality of elongated members, means mounted on the frame for supporting and rotating the elongated members from an elevated index position into working position in engagement with the surface, folding means mounted on the frame for folding said article about said retaining means, cam and cam follower means supported on the frame and mechanically connected to the retaining means and folding means for operating said retaining means and said folding means in relative sequence, a collar form mounted on the frame surface, means for releasably holding the collar form in an expanded condition, said means normally holding the collar form in an expanded condition, means connected to the frame for maintaining said elongated members in an elevated position, an operator control member mounted on the frame, and means connecting the operator control member to the releasably holding means and the maintaining means for releasing the maintaining means and the holding means, contracting the collar form, and holding the elongated members elevated upon operation of the control member, and releasing the elongated members for rotation to a working position upon further operation of said control member.

52. In combination, a machine frame having a work surface thereon, retaining means on the frame for retaining an article on said surface, folding means mounted on the frame for folding said article about said retaining means, said retaining means including a plurality of elongated flexible members, a drum for each flexible member into which said member is adapted to be retracted and means for retracting each of said elongated members into its housing, said retracting means being mounted on the frame to extend partially into the confines of said drum housings.

References Cited in the file of this patent

UNITED STATES PATENTS 1,639,948 Lamatsch -------------- Aug. 3, 1927

(Other references on following page)

UNITED STATES PATENTS

| | | |
|---|---|---|
| 2,130,733 | Combarette | Sept. 20, 1938 |
| 2,362,976 | Cooper | Nov. 21, 1944 |
| 2,369,607 | Rieck | Feb. 13, 1945 |
| 2,556,079 | Gaybing | June 5, 1951 |
| 2,567,385 | Lighter | Sept. 11, 1951 |
| 2,616,594 | Calder et al. | Nov. 4, 1952 |
| 2,616,595 | Arruda | Nov. 4, 1952 |
| 2,665,039 | Neckel | Jan. 5, 1954 |
| 2,687,832 | Westwood | Aug. 31, 1954 |
| 2,737,765 | Reid | Mar. 13, 1956 |

FOREIGN PATENTS

| | | |
|---|---|---|
| 627,367 | Great Britain | Aug. 8, 1949 |